United States Patent
Kitajima

(10) Patent No.: US 7,640,569 B2
(45) Date of Patent: Dec. 29, 2009

(54) VIDEO REPRODUCING SYSTEM USING DEFINITION INFORMATION TO ACQUIRE SUB INFORMATION STORED IN NETWORK SERVER TO REPRODUCE IT WITH RELATED VIDEO INFORMATION ON RECORDING MEDIUM

(75) Inventor: Kotaro Kitajima, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 370 days.

(21) Appl. No.: 11/754,419

(22) Filed: May 29, 2007

(65) Prior Publication Data

US 2007/0299974 A1 Dec. 27, 2007

(30) Foreign Application Priority Data

Jun. 26, 2006 (JP) ............................. 2006-175787

(51) Int. Cl.
*H04N 7/173* (2006.01)
(52) U.S. Cl. ..................... 725/115; 725/114; 725/145
(58) Field of Classification Search ................. 725/114, 725/115, 145, 89, 134, 38, 135, 91, 92, 93, 725/105, 116, 118, 141, 142; 386/46
See application file for complete search history.

(56) References Cited

U.S. PATENT DOCUMENTS 6,785,463 B2 * 8/2004 Yamauchi et al. ............. 386/46

| | | | |
|---|---|---|---|
| 2003/0161615 A1 | 8/2003 | Tsumagari et al. | |
| 2003/0231861 A1 | 12/2003 | Yoo et al. | |
| 2004/0163116 A1 * | 8/2004 | Taira et al. | 725/89 |
| 2005/0076392 A1 * | 4/2005 | Jung et al. | 725/135 |
| 2005/0155058 A1 * | 7/2005 | Jung et al. | 725/38 |
| 2006/0059531 A1 * | 3/2006 | Fukuda et al. | 725/134 |
| 2006/0098936 A1 | 5/2006 | Ikeda et al. | |

FOREIGN PATENT DOCUMENTS

| | | |
|---|---|---|
| EP | 1 553 769 A1 | 7/2005 |
| EP | 1 711 009 A1 | 10/2006 |
| JP | 2005-136762 | 5/2005 |
| WO | WO 2005/074270 A1 | 8/2005 |

* cited by examiner

Primary Examiner—Le Luu
(74) Attorney, Agent, or Firm—Cowan, Liebowitz & Latman, P.C.

(57) ABSTRACT

A technique for sequentially updating a recording medium as if sub contents, related to a video image as a main content recorded on the recording medium, are stored on the recording medium, such that the sub contents can be reproduced. When reproduction of the video image as a main content recorded on an optical disk has been completed, a content server is accessed in accordance with bind definition designation information stored on the optical disk. Then, bind definition information in which link information to access a sub content such as special video images stored on the content server is described is downloaded. Then, based on the downloaded bind definition information, the link information to access the sub content is stored onto the optical disk, thereby the sub content can be reproduced.

19 Claims, 18 Drawing Sheets

VIDEO REPRODUCING SYSTEM USING DEFINITION INFORMATION TO ACQUIRE SUB INFORMATION STORED IN NETWORK SERVER TO REPRODUCE IT WITH RELATED VIDEO INFORMATION ON RECORDING MEDIUM

BACKGROUND OF THE INVENTION

1. Field of the Invention

The present invention relates to a technique for reproducing a video image recorded on a recording medium.

2. Description of the Related Art

In recent years, digital contents have been distributed in various forms. In one known distribution form, digital contents related to each other are distributed using plural media.

For example, a main content such as video image and sound as a cinema motion picture is recorded on an optical disk typified by a DVD (Digital Versatile Disc) and the disk is provided, and sub contents such as captions are provided via a medium such as a Flash Media Server or a network. A user who handles such digital content reproduces the digital content using his/her reproducing apparatus such as a PC (Personal Computer) or a disk player. The reproducing apparatus handles the main content and the sub contents as if they were recorded on one medium (see Japanese Patent Application Laid-Open No. 2005-136762).

More particularly, audio information is recorded on the optical disk in addition to the main video image. Further, the sub contents stored on a content server on the network include captions in plural languages and application software. The sub contents are provided to the reproducing apparatus via, for example, the network. The main content and the sub contents recorded on the optical disk are linked with each other. The reproducing apparatus downloads the sub contents linked to the main content, and thereby utilizes the sub contents. The main content requiring a large storage capacity is recorded on the optical disk to be provided, and the sub contents requiring comparatively smaller storage capacity are provided via the network. In this manner, various contents can be provided independently of the storage capacity of optical disk medium. Further, the sub contents can be easily updated only by changing data on the content server.

Next, the configuration of the reproducing apparatus to realize the above digital data distribution will be described based on the drawings.

FIG. 16 is a block diagram showing the configuration of a reproducing apparatus for video reproduction from an optical disk. In FIG. 16, reference numeral 1600 denotes a removable optical disk such as a DVD; 1601, an optical head unit having a motor, an actuator and the like to control an optical head and perform position control on the optical head; 1602, a drive controller to control driving of the optical head unit 1601; 1603, an error corrector; 1604, a separator to separate data; 1605, a product ID decoder to decode a product ID of the optical disk 1600; 1606, a network interface; 1607, a content decoder to decode content data such as a video image; 1608, an output unit to output information; 1609, an operation unit to receive a user's input; 1610, a content server; and 1620, a system controller.

Next, an operation of the above reproducing apparatus upon reproduction from the optical disk 1600 will be described. The optical disk 1600 holds content data such as a video image and audio information. When the operation unit 1609 receives an optical disk reproduction request from the user, the operation unit 1609 outputs the reproduction request to the system controller 1620. The system controller 1620 issues a data reading request to the drive controller 1602. The drive controller 1602 controls the optical head unit 1601, thereby controls the reading of data from the optical disk 1600. The optical head unit 1601 reads data from the optical disk 1600, and outputs the data to the error corrector 1603. The error corrector 1603 corrects defect(s) of the optical disk medium or error(s) upon recording and reproduction, and outputs a digital data string to the data separator 1604. The data separator 1604 separates the input digital data to content data such as video data and audio data, and management information such as a product ID to be described later. The data separator 1604 outputs the management information such as a product ID to the product ID decoder 1605, while outputting the content data to the content decoder 1607. The content decoder 1607 decodes the input video data and audio data, and outputs the decoded data to the output unit 1608. The output unit 1608 having a monitor, a speaker and the like outputs the decoded content data.

Next, reproduction of contents provided from the content server 1610 will be described. When the operation unit 1609 receives a list display request for display of reproducible contents in the form of list, the system controller 1620 controls the drive controller 1602 to read data including management information recorded in a predetermined area of the optical disk 1600. The data read from the optical disk 1600 is inputted into the data separator 1604 through a similar process to that described above. The data separator 1604 extracts the management information from the input data and outputs the management information to the product ID decoder 1605. The product ID decoder 1605 extracts a product ID and content server information from the management information.

Note that the product ID means information for identification of a content recorded on the optical disk 1600, for example, a product ID of the optical disk 1600. Further, the content server information means data indicating the location of the content server 1610 on the network such as a URL.

The product ID decoder 1605 outputs the product ID data and the content server information to the network interface 1606. The network interface 1606 establishes connection with the content server 1610 specified with the content server information via the network, and outputs the product ID data to the content server 1610. The content server 1610 returns available bind definition information corresponding to the product ID data to the reproducing apparatus. The bind definition information is a file in which a procedure necessary for bind processing to be described later is described. The system controller 1620 obtains the bind definition information via the network interface 1606, and binds the sub content data on the content server 1610 based on the bind definition information.

Note that "bind" means connecting main content data recorded on the local optical disk 1600 to sub content data provided from the content server 1610. Hereinbelow, a method for binding content data provided from the content server 1610 will be described.

FIG. 17A shows an example of a directory structure of content data stored on the optical disk 1600. A directory 1700 is a root directory of the content data recorded on the optical disk 1600; a directory 1710, a directory for storing management information; data 1711 is content server information; and data 1712, product ID data. Further, a directory 1720 is a main video directory for storing video data; and data 1721, video data. Further, a directory 1730 is a caption directory for storing caption data; and data 1731, caption data (language A and language B).

In a single optical disk having the structure shown in FIG. 17A, a "main video image" as the main video data and caption data "language A" and "language B" corresponding to the main video data are recorded. The reproducing apparatus can select the caption data "language A" or the caption data "language B" for the "main video image" when it performs reproduction.

On the other hand, FIG. 17B shows the directory structure of content data stored on the content server 1610 in FIG. 16. A directory 1740 is a root directory of the content data on the content server 1610; and directories 1750 and 1760, directories holding data corresponding to product IDs. Further, data 1751 is bind definition information; a directory 1770, a directory holding caption data; and data 1771, caption data (languages C to F).

The reproducing apparatus sends the product ID data 1712 of the optical disk 1600 to the content server 1610 having the above directory structure. The content server 1610 returns bind definition information recorded in a directory corresponding to the product ID of the optical disk 1600 to the reproducing apparatus.

For example, when the product ID of the optical disk 1600 is "0001", the content server 1610 returns the bind definition information 1751 corresponding to the product ID "0001" to the reproducing apparatus. The bind definition information includes a description to add the contents included in the caption directory 1770 of the content server 1610 to the caption directory 1730 of the optical disk 1600.

The reproducing apparatus interprets the bind definition information 1751, and binds the contents on the content server 1610 to the content on the optical disk 1600. FIG. 18 shows the directory structure of the optical disk 1600 in which the contents are bound in accordance with the bind definition information 1751.

In FIG. 18, directories and data 1700 to 1731 correspond to the directories and data having the same reference numerals in FIG. 17A. As a result of binding in accordance with the bind definition information 1751, caption data 1732 is newly added. The caption data 1732 corresponds to the data 1771 in FIG. 17B. Note that the caption data 1732 after the binding is not actually recorded on the optical disk 1600, but linkage to the data on the content server 1610 is managed by the reproducing apparatus.

By the binding in accordance with the bind definition information, the reproducing apparatus can make a selection from captions in 6 languages, "language A" to "language F", for the "main video A" when it performs reproduction. Note that the "language C" to "language F" caption data are link information as described above. Accordingly, when the user has given the instruction for reproduction, the reproducing apparatus downloads the content from the content server via the network and perform reproduction.

As described above, contents on a network, which are not included in a local optical disk, can be utilized as if they are parts of a content included in the optical disk by binding the content in accordance with bind definition information corresponding to a product ID.

However, the bind definition information for binding as described above is provided in correspondence with only a product ID of a package medium. Accordingly, it is impossible to perform addition, change and the like of content to be bound in correspondence with user's content reproducing situation or the like.

SUMMARY OF THE INVENTION

The present invention has been made in view of the above problem, and provides a technique for sequentially updating a recording medium as if sub contents linked with a video image as a main content recorded on the recording medium are stored on the recording medium, such that the sub contents can be reproduced.

According to a first aspect of the present invention, there is provided a video reproducing apparatus comprising: a reproducing unit to reproduce information recorded on a recording medium; a communication unit to establish connection with a network; an acquisition unit to perform communication with a network server holding sub information related to video information recorded on the recording medium via the communication unit and acquire definition information describing information related to a location of the sub information from the network server, based on predetermined information reproduced by the reproducing unit; and a control unit to change the definition information acquired by the acquisition unit in correspondence with a status of the video reproducing apparatus.

According to a second aspect of the present invention, there is provided a video reproducing apparatus for reproducing video information recorded on a recording medium comprising: a communication unit to establish connection with a network; an acquisition unit to perform communication with a network server holding sub information related to video information recorded on the recording medium via the communication unit and acquire definition information describing information related to a location of the sub information from the network server, based on predetermined information recorded on the recording medium; a reproducing unit to reproduce the video information and sub information in accordance with the definition information acquired by the acquisition unit upon reproduction of video information recorded on the recording medium; and a control unit to perform control to acquire new definition information from the network server in correspondence with a reproduction status in the reproducing unit.

According to a third aspect of the present invention, there is provided a control method for a video reproducing apparatus having a communication unit to establish connection with a network, comprising: a reproducing step of reproducing information recorded on a recording medium; an acquisition step of performing communication with a network server holding sub information related to video information recorded on the recording medium via the communication unit and acquiring definition information describing information related to a location of the sub information from the network server, based on predetermined information reproduced at the reproducing step; and a control step of changing the definition information acquired at the acquisition step in correspondence with a status of the video reproducing apparatus.

According to a fourth aspect of the present invention, there is provided a control method for a video reproducing apparatus having a communication unit to establish connection with a network, for reproducing video information recorded on a storage medium, comprising: an acquisition step of performing communication with a network server holding sub information related to video information recorded on the recording medium via the communication unit and acquiring definition information describing information related to a location of the sub information from the network server, based on predetermined information recorded on the recording medium; a reproducing step of reproducing the video information and sub information in accordance with the definition information acquired at the acquisition step upon reproduction of video information recorded on the recording medium; and a control step of performing control to acquire new definition information from the network server in correspondence with a reproduction status at the reproducing step.

According to the present invention, the recording medium can be sequentially updated as if sub contents linked with a video image as a main content recorded on the recording medium are stored on the recording medium, such that the sub contents can be reproduced.

Particularly, in the video reproducing apparatus, a bind destination of the sub contents can be added and/or changed in correspondence with reproduction information. In this arrangement, sub contents corresponding to a reproducing situation can be provided. For example, when a user watches the entire main video image, the user is enabled to watch a special video image.

Further, as information designating a bind destination is recorded on an optical disk, the sub contents can be utilized in correspondence with reproduction situation, independently of reproducing machine.

Further, in an image pickup apparatus according to the present invention, a bind destination of sub contents such as editing contents can be added and/or changed in correspondence with photographing information. In this arrangement, sub contents can be provided in a flexible manner in correspondence with a photographing position, a user's level of usage (beginner or advanced user) or the like.

Further features of the present invention will become apparent from the following description of exemplary embodiments with reference to the attached drawings.

DESCRIPTION OF THE EMBODIMENTS

Hereinbelow, preferred embodiments of the present invention will be described in detail with reference to the attached drawings.

First Embodiment

As a first embodiment, an optical disk reproducing apparatus capable of reproducing video and audio data recorded on a recording medium such as an optical disk will be described.

Figure 1:
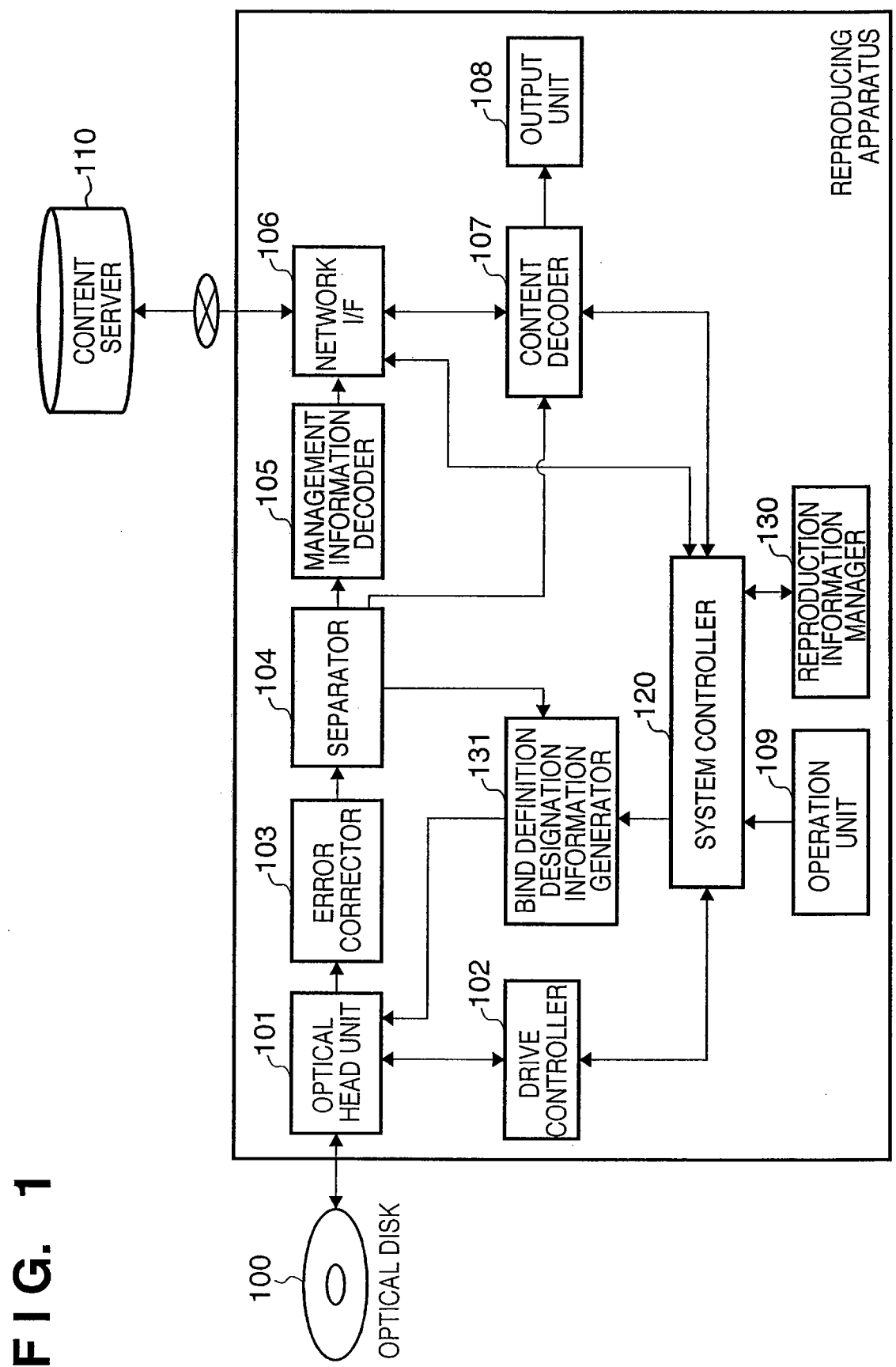
FIG. 1 is a block diagram showing the configuration of an optical disk reproducing apparatus according to a first embodiment of the present invention.

FIG. 1 is a block diagram showing the configuration of an optical disk reproducing apparatus as the reproducing apparatus according to the present embodiment.

Figure 16:
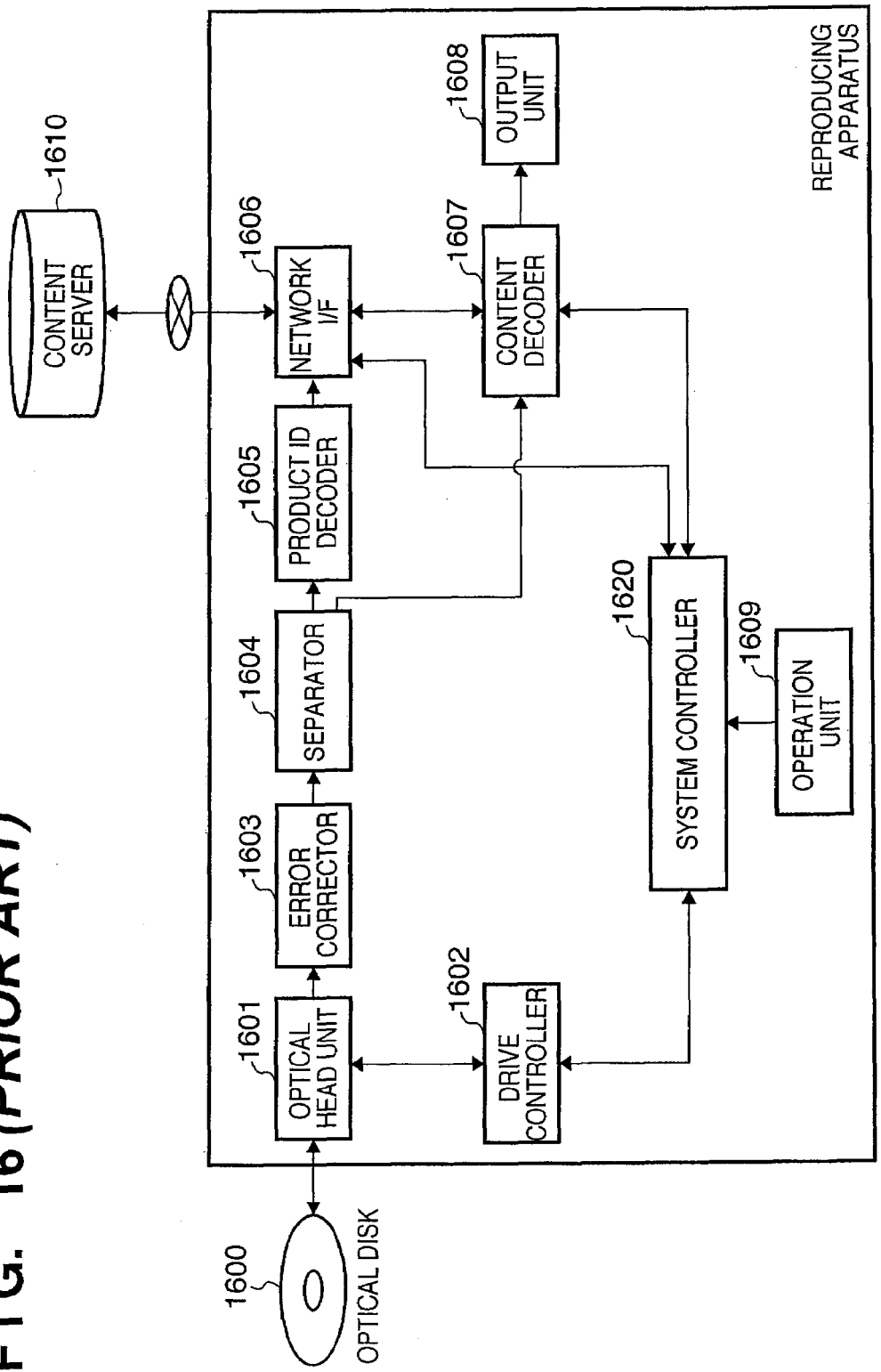
FIG. 16 is a block diagram showing the configuration of the disk reproducing apparatus according to the conventional art.
Figures 17A, 17B:
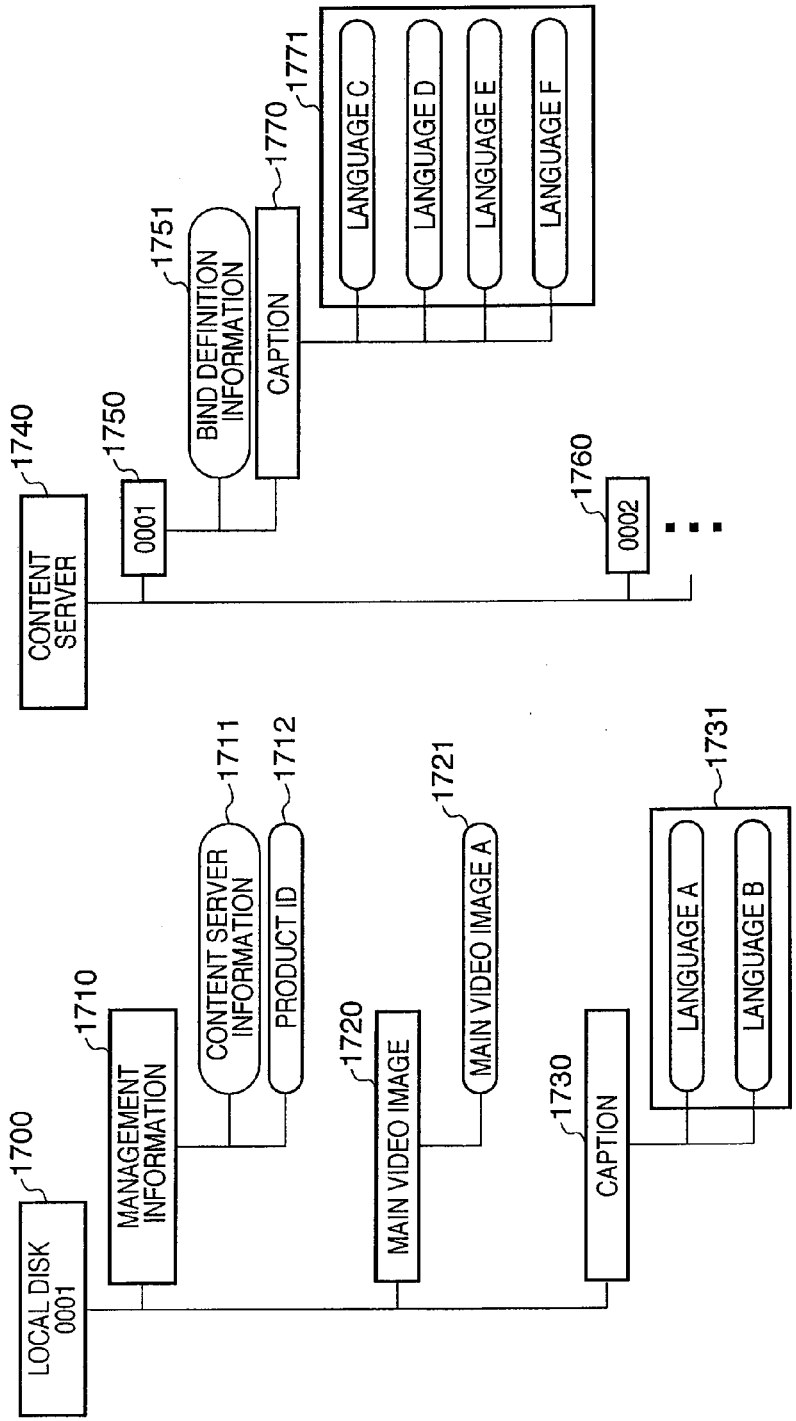
FIGS. 17A and 17B are block diagrams showing the file structures of content data stored on the optical disk and the content server according to the conventional art.

In FIG. 1, the constituent elements from a writable optical disk 100 to a system controller 120 are the same as those described in the background art denoted by numerals 1600 to 1620 in FIG. 16. In the present embodiment, a reproduction information manager 130 and a bind definition designation information generator 131 are added to the above elements.

Content Reproduction Operation

Next, an operation of the reproducing apparatus having the above configuration when it reproduces a content recorded on an optical disk 100 will be described. The optical disk 100 holds content data such as main video image and main audio data. Further, data can be read/written from/to the optical disk 100 using an optical head unit 101. At an operation unit 109, when an optical disk reproduction request has been received from the user, the optical head unit 101 reads data, then an error corrector 103 performs error correction on the data, and then a separator 104 extracts content data and outputs the content data to a content decoder 107. The decoding by the content decoder 107 and output of the decoded data to an output unit 108 are the same as those in the above-described background art, accordingly, the detailed explanations of these operations will be omitted. Further, as in the case of the background art, sub contents such as caption data are recorded on a content server 110, and the reproducing apparatus can utilize the sub contents via a network. Note that as sub contents provided on the content server 110, computer graphics (CG), sub audio data and the like may be handled in addition to the caption data.

Next, an operation of the reproducing apparatus upon reproduction of the sub contents recorded on the content server 110 will be described.

The reproducing apparatus reads management information data recorded in a predetermined area of the optical disk 100 at a predetermined timing such as starting. The data read from the optical disk 100 is inputted into the separator 104. The separator 104 extracts management information data from the input data and outputs the extracted data to a management information decoder 105. The management information decoder 105 extracts bind definition designation information, product ID data and content server information from the management information data. Note that the bind definition designation information means information designating bind definition information (to be described later) recorded on the content server 110. The content server information and the product ID data are the same as those in the above-described background art.

A network interface 106 establishes connection with the content server 110 designated with the content server information via the network, and outputs the product ID data and the bind definition designation information to the content server 110. The content server 110, holding plural bind definition information corresponding to product IDs, and returns one or plural bind definition information corresponding to the input bind definition designation information. The system controller 120 binds data on the content server 110 based on the bind definition information received from the content server 110.

Figure 2:
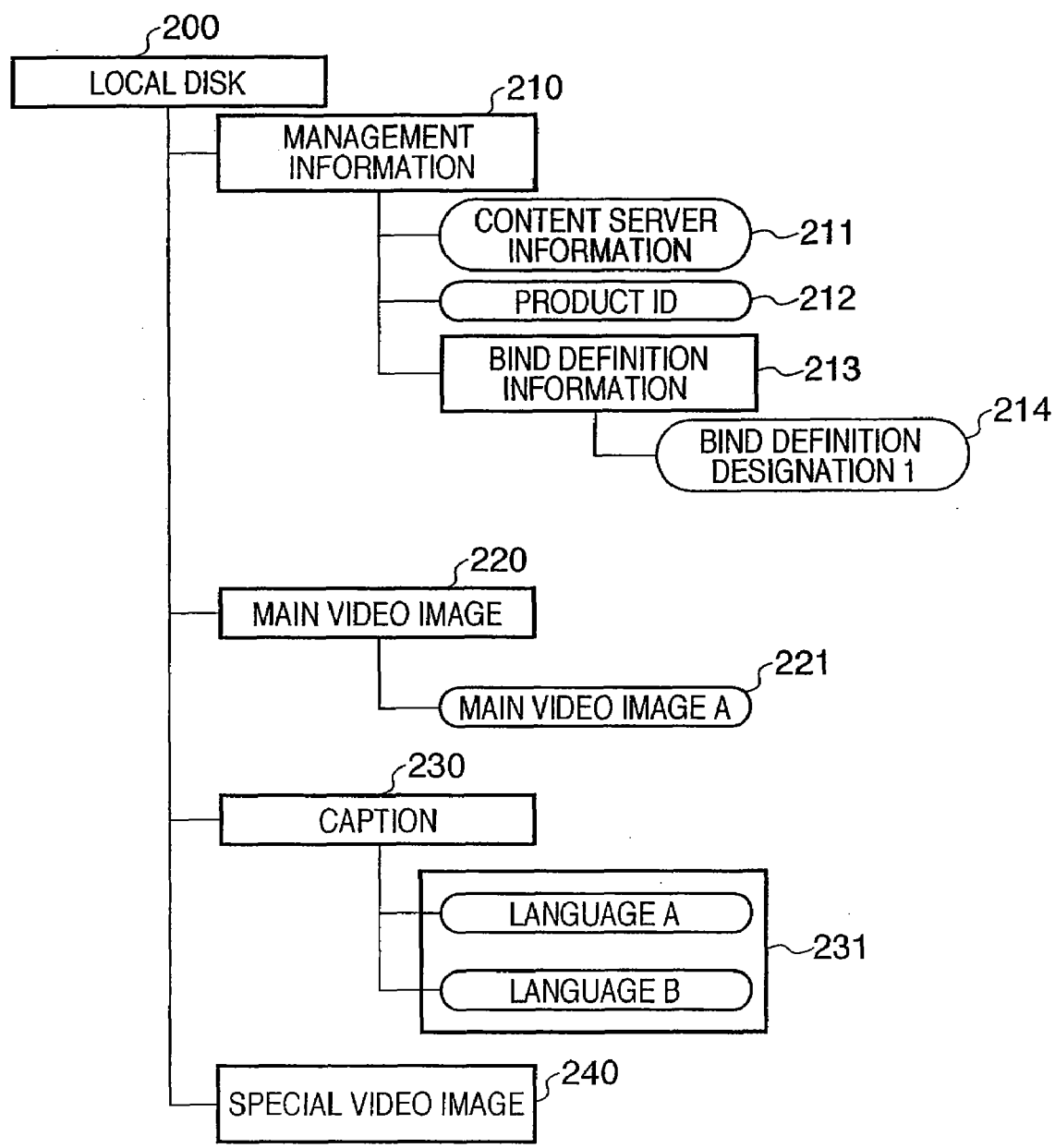
FIG. 2 is a block diagram showing a file structure of content data stored on an optical disk according to the first embodiment.

Next, the binding of data on the content server 110 will be more particularly described. FIG. 2 shows a file structure of content data stored on the optical disk 100. A directory 200 is a root directory of the content data stored on the optical disk 100; and a directory 210, a directory for storing management information. Data 211 is content server information; and data 212, product ID data. Further, a directory 213 is a directory for storing bind definition designation information; and data 214, the bind definition designation data. Further, a directory 220 is a main video directory holding video data; and data 221, the video data. Further, a directory 230 is a caption data directory holding caption data; and data 231, caption data (language A and language B). Further, a directory 240 is a directory for storing a special video image (e.g., in a cinema content, a video clip not related to a main part of the cinema).

In the single optical disk having the structure shown in FIG. 2, main video data "main video image" and corresponding caption data "language A" and "language B" are recorded. Accordingly, the reproducing apparatus can make a selection from "language A" or "language B" captions for the "main video image" when it performs reproduction. As nothing is recorded in the special video image directory 240, any special video image cannot be reproduced from the single optical disk.

Figure 3:
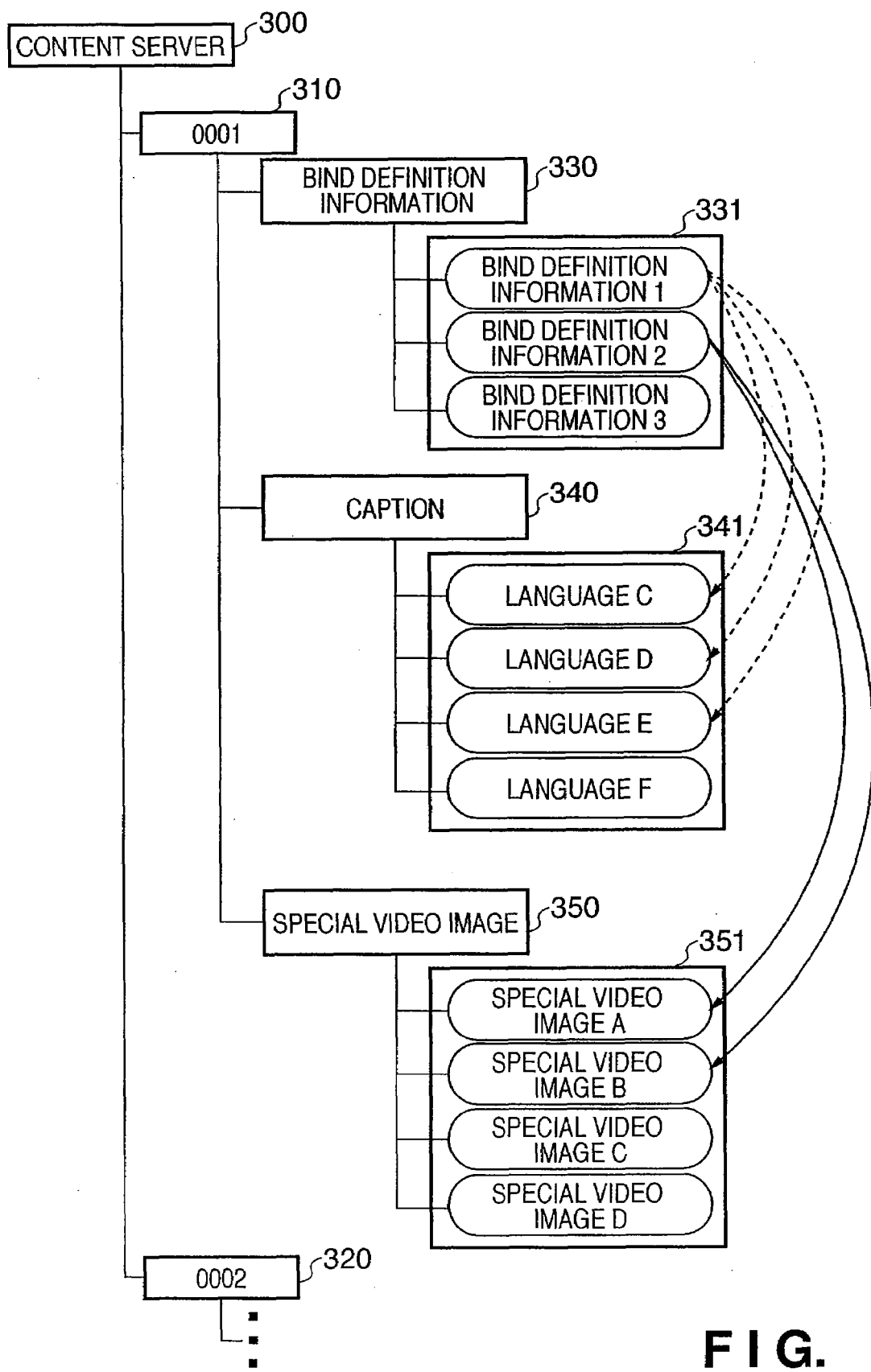
FIG. 3 is a block diagram showing a file structure of content data stored on a content server according to the first embodiment.

On the other hand, FIG. 3 shows a file structure of content data stored on the content server 110. A directory 300 is a root directory of the content server 110; directories 310 and 320, directories holding content data corresponding to product IDs; a directory 330, a directory holding bind definition information; data 331, bind definition information; a directory 340, a directory holding caption data; and data 341, the caption data (C to F). Further, a directory 350 is a special video image directory holding a special video image; and data 351, special video data.

When the contents on the content server having the structure shown in FIG. 3 are bound to the content on the optical disk 100, the reproducing apparatus sends the product ID data 212 and the bind definition designation information 214 recorded on the optical disk 100 to the content server 110 as described above. The content server 110 returns bind definition information specified with the product ID data 212 and the bind definition designation information 214 to the reproducing apparatus.

For example, when the product ID of the optical disk 100 is "0001" and the bind definition designation information 214 designates "bind definition information 1", the content server 110 returns "bind definition information 1" in the bind definition information directory 330 to the reproducing apparatus. The bind definition information is a file in which a procedure for bind processing is described. In this case, the "bind definition information 1" is a file in which a bind procedure for adding the contents, the "language C", "language D" and "language E" caption data included in the caption directory 340 of the content server 110 to the caption directory 230 of the optical disk 100 is described.

Figure 4:
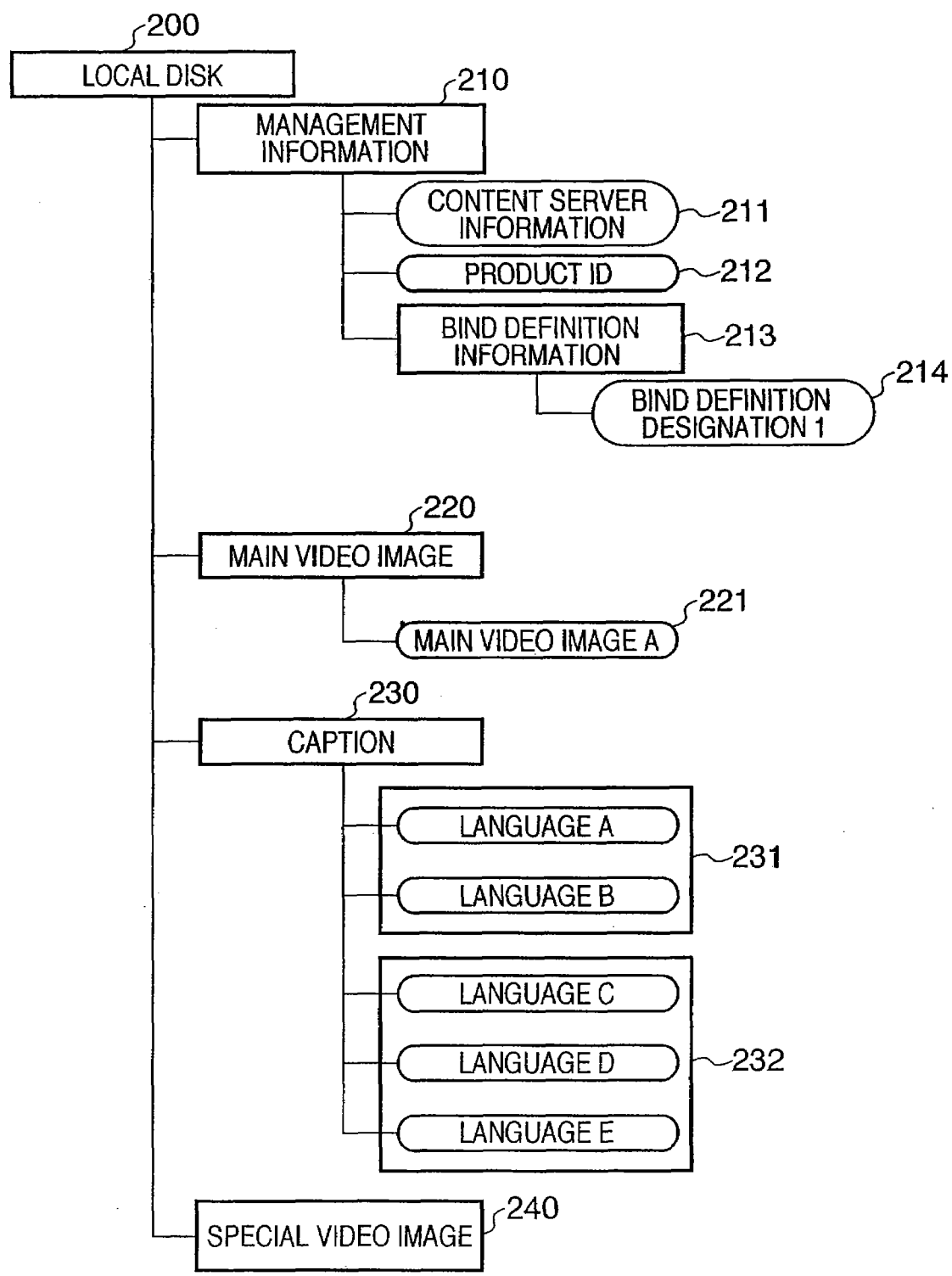
FIG. 4 is a block diagram showing the file structure of content data stored on the optical disk after an update according to the first embodiment.

The reproducing apparatus binds the contents on the content server 110 to the content on the optical disk 100 in accordance with the received bind definition information. FIG. 4 shows the directory structure of the optical disk 100 in which the contents on the content server 110 are bound in accordance with the "bind definition information 1" in FIG. 3 (data structure after update). In FIG. 4, the directories and data correspond to the directories and data having the same numerals in FIG. 2. As a result of binding of the contents in accordance with the "bind definition information 1", caption data 232 is newly added to the caption directory 230. The caption data 232 corresponds to the "language C", "language D" and "language E" caption data 341 in FIG. 3. The caption data 232 after the binding is not actually recorded on the optical disk 100, but the caption data 232 is managed by the reproducing apparatus as link information to data on the content server 110. Further, since the "language C" to "language F" caption data are link information, upon issuance of reproduction instruction, they are downloaded via the network and reproduced. After the binding of the contents on the content server 110, the reproducing apparatus can make a selection from captions in 5 languages, "language A" to "language E" for the "main video image A" when it performs reproduction.

Addition of Bind Definition Designation Information

In the above description, the method for designating bind definition information used for binding based on bind definition designation information previously recorded on the optical disk 100 has been described. Next, additional recording of new bind definition designation information onto the optical disk 100 in correspondence with reproduction information will be described.

In FIG. 1, when reproduction of content recorded on the optical disk 100 is performed, reproduction information indicating the reproduced content is recorded in the reproduction information manager 130. Next, by completion of reproduction of one content, the system controller 120 reads program data for determination of bind definition designation information from the optical disk 100. The program data for determination bind definition designation information is read from the optical disk 100, then extracted by the separator 104 and outputted to the bind definition designation information generator 131. In the program data for determination bind definition designation information, a procedure for determining bind definition designation information in accordance with the above-described reproduction information is described. The bind definition designation information generator 131 generates bind definition designation information by execution of the program.

Figure 5:
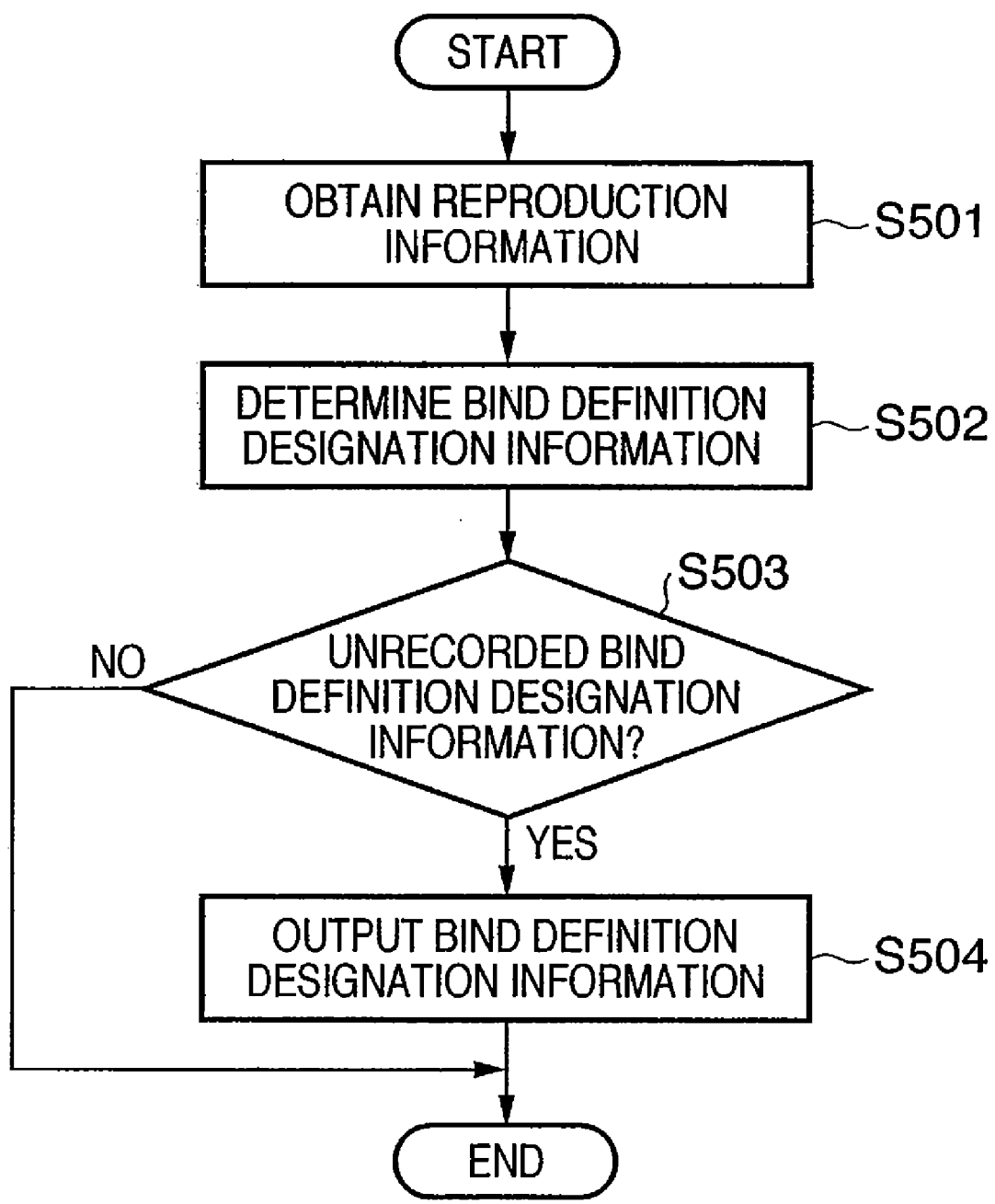
FIG. 5 is a flowchart showing an operation of a bind definition designation information generator according to the first embodiment.

Next, the operation of the bind definition designation information generator 131 will be described in detail using FIG. 5. FIG. 5 is a flowchart showing the operation of the bind definition designation information generator 131.

In step S501, reproduction information managed by the reproduction information manager 130 is obtained. As described above, the reproduction information is data indicating a reproduced content recorded on the optical 100.

In step S502, bind definition information (331 in FIG. 3) recorded on the content server 110 to be designated is determined in accordance with the obtained reproduction information. The determination is made by executing the above-described program for determination of bind definition designation information. The program designates one or more pieces of bind definition information 331 stored on the content server 110 based on the reproduction information inputted from the reproduction information manager 130.

For example, when reproduction of main video data 221 recorded on the optical disk 100 has been completed, new bind definition designation information "bind definition designation information 2" corresponding to the completion of reproduction of the main video data 221 is generated. The "bind definition designation information 2" designates the "bind definition information 2" among the bind definition information (331 in FIG. 3) included in the content server 110.

In step S503, it is examined whether or not the bind definition designation information generated in step S502 is unrecorded on the optical disk 100. When the bind definition designation information is not recorded, the process proceeds to step S504. On the other hand, when the bind definition designation information is recorded, the process ends.

In FIG. 2, in the bind definition designation information directory 213, only the "bind definition designation information 1" is recorded as bind definition designation information. In this case, as the "bind definition designation information 2" generated in step S502 is unrecorded, the process proceeds to step S504.

In step S504, to record the bind definition designation information generated in step S502 onto the optical disk 100, the information is outputted to the optical head unit 101.

By the above operation, when new bind definition designation information is outputted from the bind definition designation information generator 131, the system controller 120 records the bind definition designation information onto the optical disk 100.

In the above description, the newly generated "bind definition designation information 2" is written onto the optical disk 100. The bind definition information on the content server 110 designated with the "bind definition designation information 2" is the "bind definition information 2" among the bind definition information 331 in FIG. 3. In the "bind definition information 2", information to bind a "special video image A" and a "special video image B" among the special video images 351 to the special video image directory 240 of the optical disk 100 is described. Accordingly, the reproducing apparatus adds a "special video image A" and a "special video image B" to the special video image directory 240 by performing binding in accordance with the "bind definition information 2". Note that the written "special video image A" and "special video image B" are not contents but information describing addresses of the special video image A and the special video image B on the content server 110.

Figure 6:
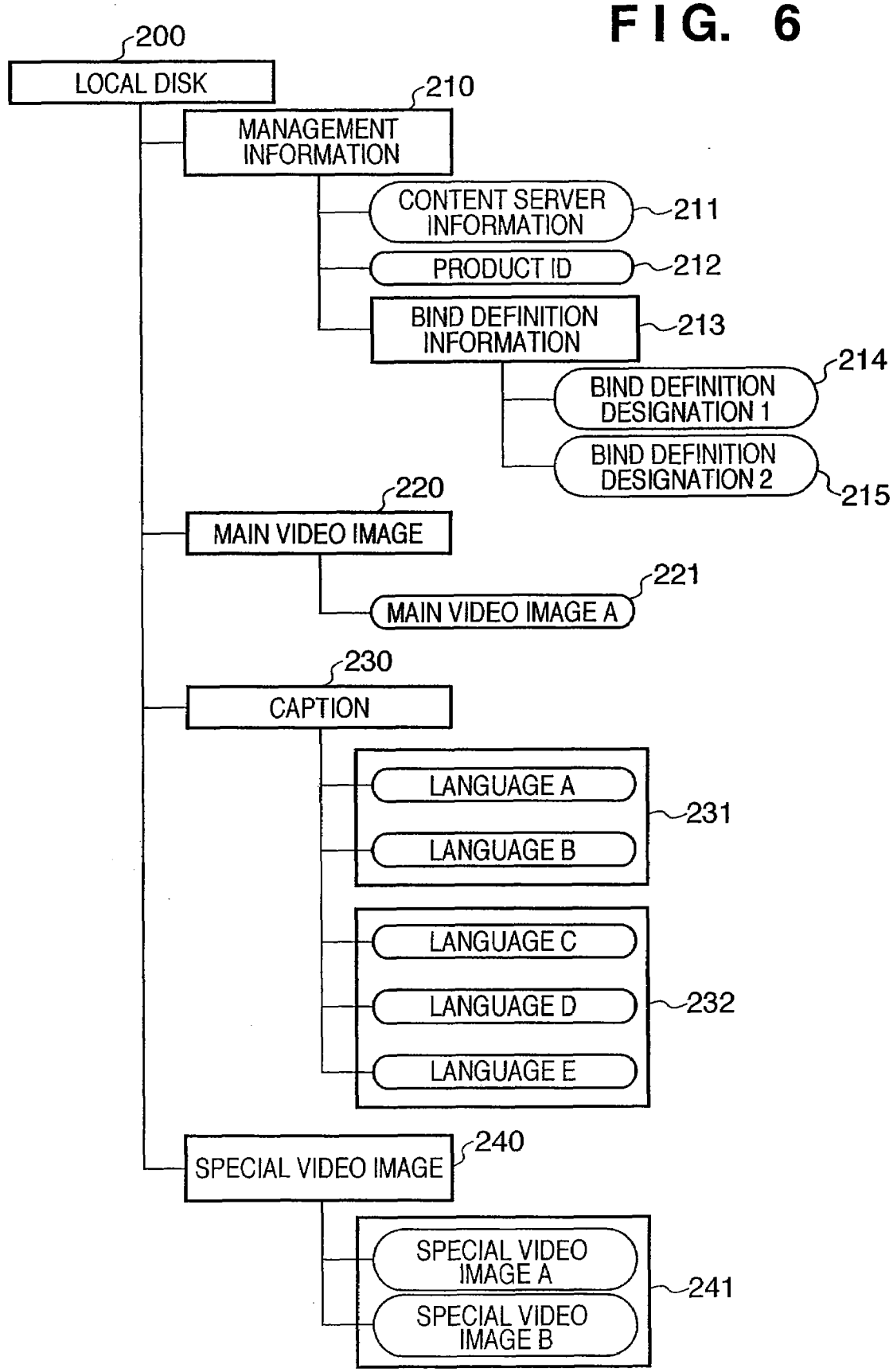
FIG. 6 is a block diagram showing the file structure of content data stored on the optical disk after a further update according to the first embodiment.

As the "bind definition designation information 2" has been newly added, the reproducing apparatus binds data on the content server 110 in accordance with information designated with the "bind definition information 1" and the "bind definition information 2". FIG. 6 shows the file structure after the binding. In FIG. 6, the directories and the data correspond to those having the same numerals described in FIG. 4. In FIG. 6, "bind definition designation information 2" 215 and special video images 241 are newly added to the elements in FIG. 4. The special video images 241 are added by binding contents corresponding to the "bind definition information 2".

The reproducing apparatus in the status shown in FIG. 6 can make a selection from the captions in 5 languages i.e. "language A" to "language E" captions when it performs reproduction. Further, the contents of the special video images 241 ("special video image A" and "special video image B") can be reproduced.

As described above, the reproducing apparatus according to the present embodiment manages reproduction information of main video or sub contents, performs a program to generate bind definition designation information based on the reproduction information, thereby generates bind definition designation information. Then the generated bind definition designation information is written onto a recording medium.

In this arrangement, contents which can be bound in accordance with reproduction condition can be additionally registered. In the above example, when all the main video image 221 has been reproduced, the special video images 241 newly provided from the content server 110 can be reproduced. In this manner, a user's watching unintended by a content producer, e.g., watching a special video image prior to a main part of a cinema (main video image 221) and knowing the end of the cinema, can be prevented. Further, contents provided from the content server 110 can be changed only by changing the bind definition information 331.

Further, as the bind definition designation information 214 and 215 designating the bind definition information 331 stored on the content server 110 are recorded on the optical disk 100, contents reflecting a reproducing situation can be bound even upon reproduction by another reproducing apparatus.

In the above embodiment, the program for determination of bind definition designation information is recorded on the optical disk 100, however, the program may be recorded on any other medium than the optical disk 100. For example, the program may be stored in a nonvolatile memory such as a ROM in the reproducing apparatus. In this case, condition information indicating bind definition information to be obtained upon completion of reproduction of corresponding content is stored on the optical disk 100. Further, the program may be recorded on the content server 110. Further, it may be arranged such that the reproducing apparatus sends reproduction information to the content server 110, and the content server 110 returns bind definition designation information based on the reproduction information.

Further, in the above embodiment, bind definition designation information is determined based on whether or not a predetermined content has been reproduced, however, any other information, such as the number of reproduction times, reproduction time, reproduction information of plural contents, can be used as reproduction information. For example, it may be arranged such that bind definition designation information to bind a special video image is generated when a CM content has been reproduced a predetermined number of times.

Further, the content server 110 may not be a single server but plural servers may be used.

Further, in the above embodiment, audio data content is omitted for the sake of simplification of explanation. The content recorded on the optical disk 100 may other forms of data than video data such as audio data. Further, the contents provided from the content server 110 are not limited to video contents but other data such as audio data and application software may be used.

Further, in the above embodiment, the reproducing apparatus having a network interface establishes connection with the content server via the network interface. However, as the feature of the present invention is generation of bind definition designation information based on content reproduction information and writing the bind definition designation information onto a recording medium, it is not necessary for the video reproducing apparatus to have a unit for connection with the content server.

Second Embodiment

As a second embodiment, a reproducing apparatus, having an image pickup function, capable of recording/reproducing video and audio data stored on a recording medium such as an optical disk will be described.

Figure 7:
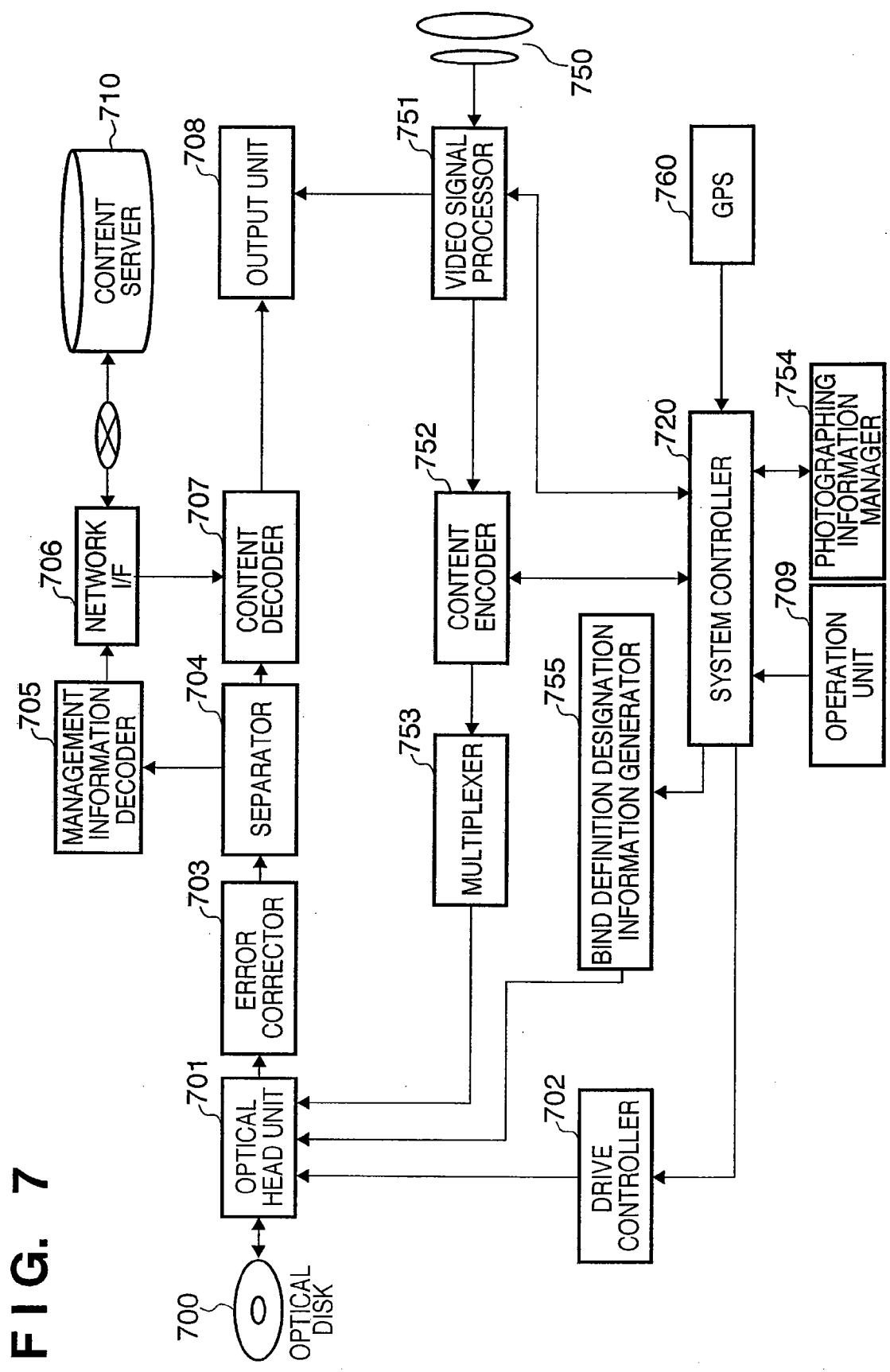
FIG. 7 is a block diagram showing the configuration of the reproducing apparatus according to a second embodiment of the present invention.

FIG. 7 is a block diagram showing the configuration of a digital video camera as a reproducing apparatus having an image pickup function and a data recording and reproduction function according to the present embodiment.

In FIG. 7, the constituent elements from a writable optical disk 700 to a system controller 720 are the same as those described in the background art denoted by numerals 1600 to 1620 in FIG. 16. In the present embodiment, an image pickup unit 750 including an optical system such as a lens and image pickup device such as a CCD, a video signal processor 751, a content encoder 752, a multiplexer 753, a photographing information manager 754 and a bind definition designation information generator 755 are provided in addition to the above elements.

Further, as a particular photographing information generation unit, a position detection unit 760 using a GPS (Global Positioning System) to obtain position information upon photographing is provided.

Further, a microphone to obtain an audio signal and an audio signal processor are provided in addition to the image sensing system, however, these elements are not shown for the sake of simplification of explanation.

Operation Upon Photographed Data Reproduction

First, an operation in the reproducing apparatus upon reproduction of photographed video data recorded on the optical disk 700 will be described. The optical disk 700 holds video data photographed by the image pickup unit 750 (an operation upon photographing will be described later). Data can be read/written from/onto the optical disk 700 using an optical head unit 701. When an operation unit 709 receives an optical disk reproduction request from a user, the optical head unit 701 reads the data, then an error corrector 702 performs error correction on the read data, and a separator 704 extracts video data from the data. Further, a content decoder 707 decodes the video data and outputs the decoded data to an output unit 708. As the operations upon reproduction are the same as those upon optical disk reproduction in the above-described the first embodiment, the detailed explanations of the operations will be omitted.

Operation Upon Content Reproduction On Content Server

Next, an operation upon reproduction of content recorded on a content server 710 will be described. The content server 710 holds video contents corresponding to photographing positions (e.g., area information video images corresponding to position information) as sub contents.

When the operation unit 709 receives a sub content display instruction from the user, the content data recorded on the content server 710 are bound.

Hereinbelow, an operation of the content server 710 upon binding will be described. The optical head unit 701 reads data including management information recorded in a predetermined area of the optical disk 700. The data read from the optical disk 700 is inputted into the separator 704. The separator 704 extracts management information data from the input data and outputs the extracted data to a management information decoder 705. The management information decoder 705 extracts bind definition designation information, a maker ID data and content server information from the management information data.

As in the case of the first embodiment, the bind definition designation information is information designating bind definition information recorded on the content server 710. The generation of the bind definition designation information and recording of the information onto the optical disk 700 will be described later. In this example, the bind definition designation information is previously recorded on the optical disk. Further, the maker ID is the ID of a maker of the reproducing apparatus that recorded data on the disk. The maker ID is recorded on the optical disk 700 upon recording of photographed data as described later. Note that the content server information indicates the location of the content server 710.

A network interface 706 establishes connection with the content server 710 designated with the content server information via the network, and outputs the bind definition designation information to the content server 710. The content server 710, holding plural bind definition information, returns bind definition information designated with the bind definition designation information from the plural bind definition information. The system controller 720 obtains the bind definition information from the content server 710 via the network interface 706, and binds data on the content server 710 based on the bind definition information.

Figure 8:
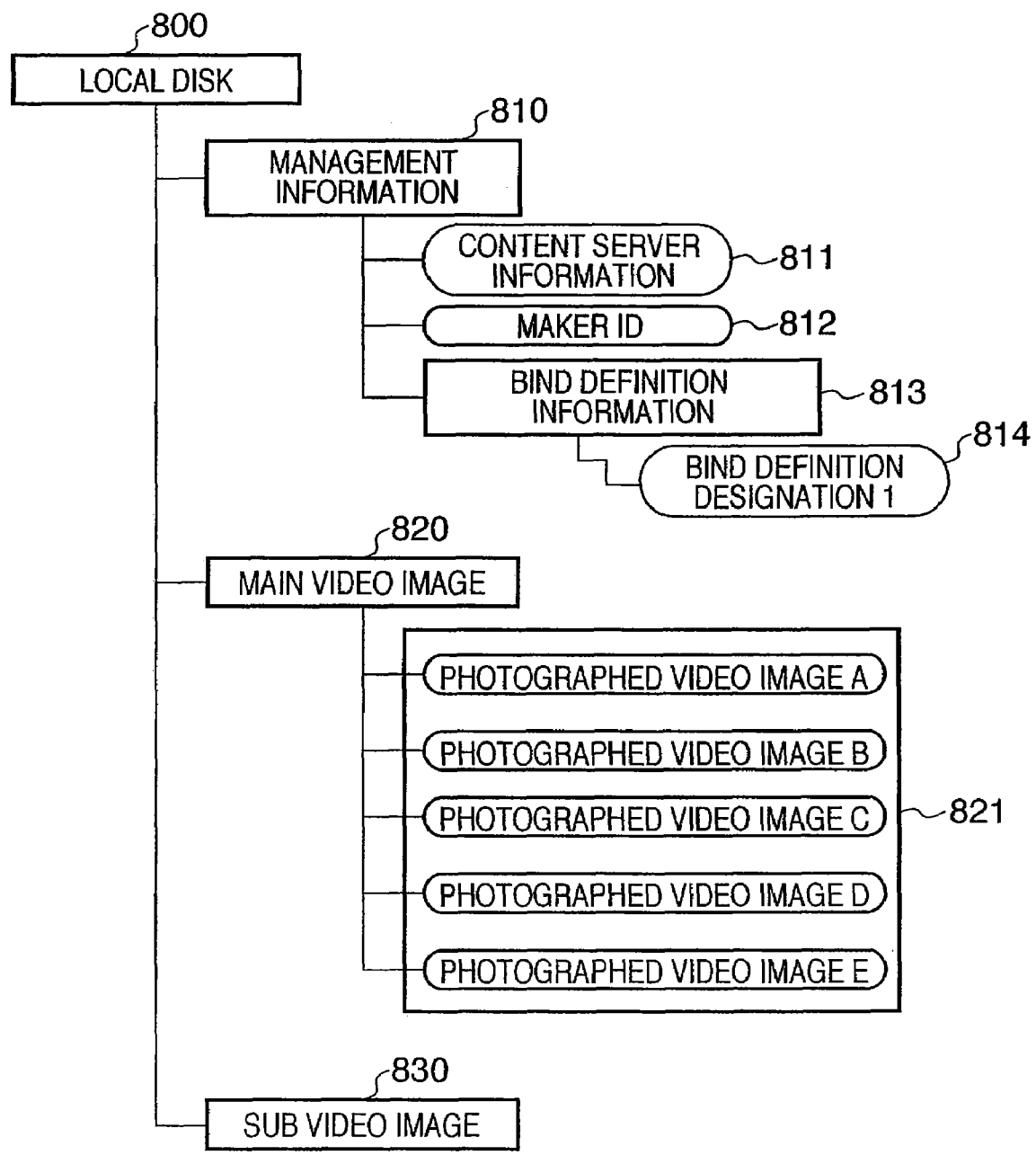
FIG. 8 is a block diagram showing the file structure of content data stored on the optical disk according to the second embodiment.

Next, the file structure upon binding will be described using FIGS. 8 to 10. FIG. 8 shows an example of the directory structure of the data stored on the optical disk 700. In FIG. 8, a directory 800 is a root directory of content data recorded on the optical disk 700; a directory 810, a directory holding disk management information; data 811, content server information; data 812, a maker ID; a directory 813, a directory holding bind definition designation information; and data 814, bind definition designation information. Further, a directory 820 is a directory holding video data; data 821, video data; and a directory 830, a directory holding sub content data.

In the single optical disk in FIG. 8, only photographed video data 821 is recorded as a content. In the status of FIG. 8 where data on the content server 710 are not bound, no sub video content is recorded in the directory 830. Accordingly, at this stage, no sub video content can be reproduced.

Figure 9:
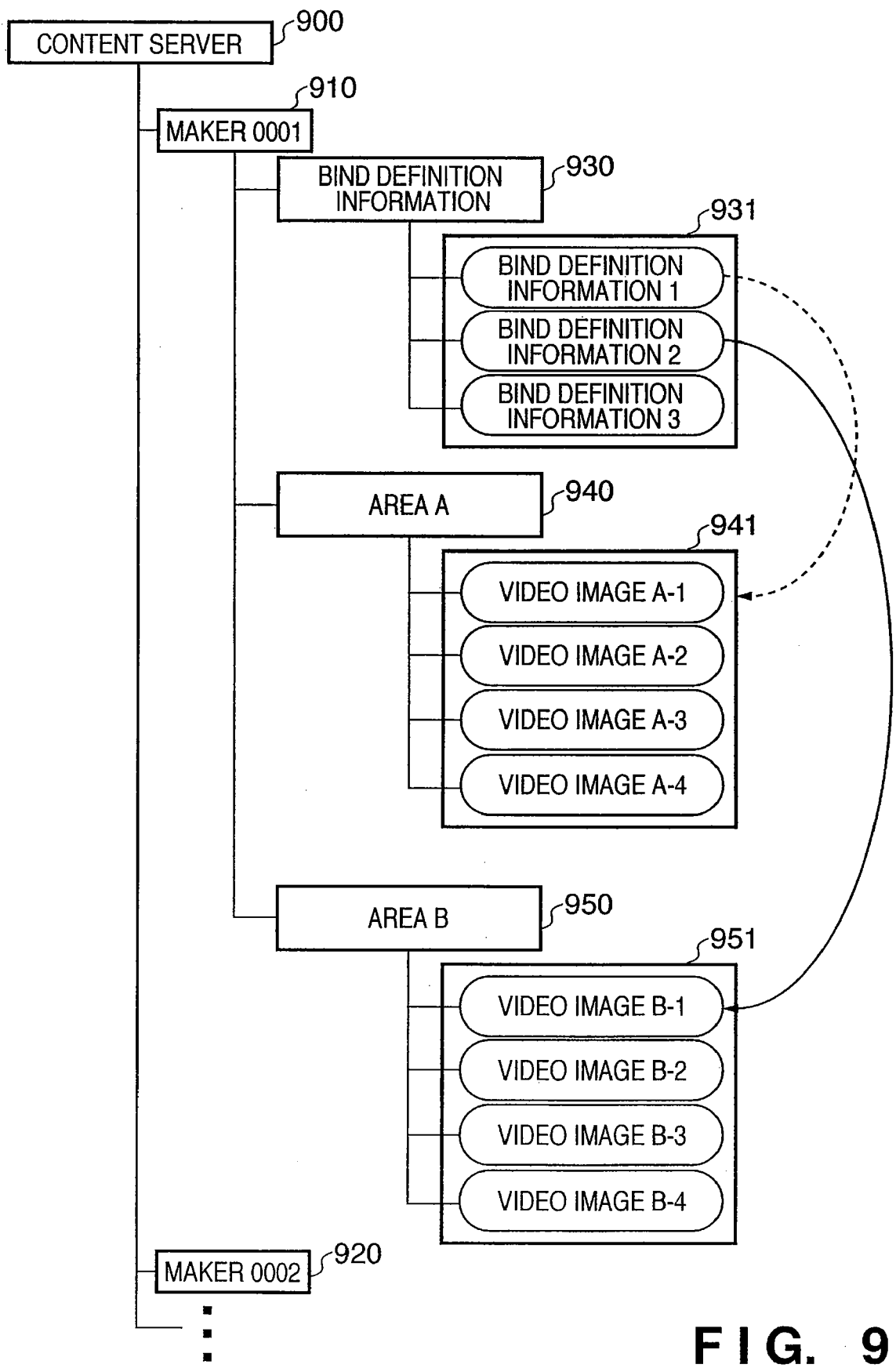
FIG. 9 is a block diagram showing the file structure of content data stored on the content server according to the second embodiment.
Figure 10:
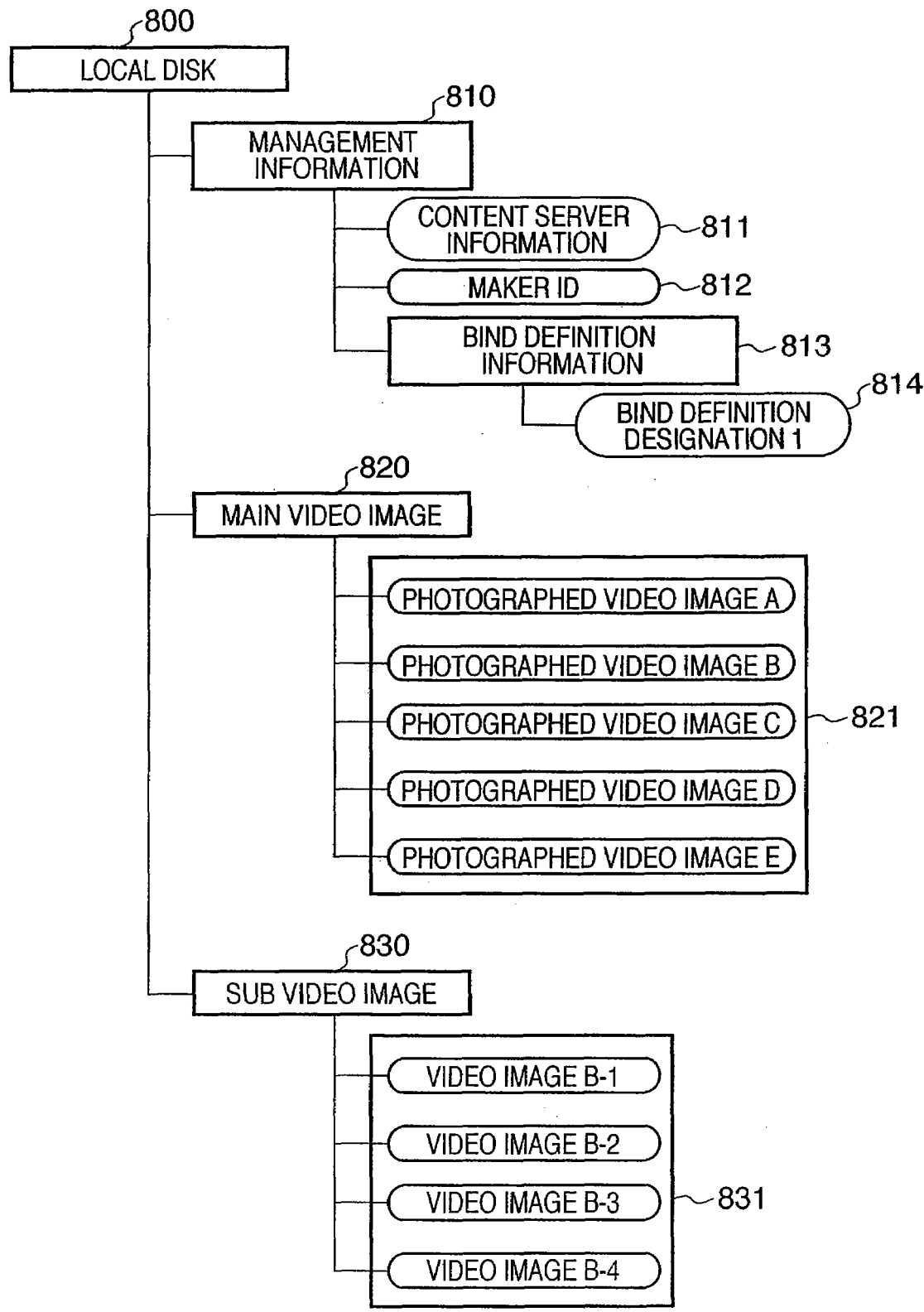
FIG. 10 is a block diagram showing the file structure of content data stored on the optical disk after the update according to the second embodiment.

On the other hand, FIG. 9 shows the directory structure of content data stored on the content server 710. A directory 900 is a root directory of the content server 710; directories 910 and 920, directories holding content data corresponding to maker IDs; a directory 930, a directory holding bind definition information; data 931, bind definition information; directories 940 and 950, directories holding sub video contents; and data 941 and 951, sub video contents.

Upon binding of the data on the content server 710 having the directory structure shown in FIG. 9, the reproducing apparatus sends the maker ID and the bind definition designation information 814 recorded on the optical disk 700 to the content server 710 as described above. The content server 710 returns bind definition information 931 designated with the bind definition designation information 814 to the reproducing apparatus. As in the case of the first embodiment, the bind definition information is a file where a binding procedure is described.

For example, when the maker ID is "maker 0001" and the bind definition designation information designates "bind definition information 1", the content server 710 returns "bind definition information 1" in the bind definition information directory 930 to the reproducing apparatus. In the "bind definition information 1", information to add sub video contents 941, "sub video image A-1" to "sub video image A-4", included in the sub video content directory 940 of the content server 710, to the sub video directory 830 of the optical disk 700 is described.

The reproducing apparatus binds the contents on the content server 710 to the content on the optical disk 700 in accordance with the received "bind definition information 1". FIG. 10 shows the directory structure of the optical disk 700 in which the contents on the content server 710 are bound. In FIG. 10, the directories and data correspond to the directories and data having the same numerals in FIG. 8. As a result of binding of the contents in accordance with the "bind definition information 1", sub video contents 831 are newly added. The sub video contents 831 are data corresponding to the sub video contents 941 in FIG. 9. As in the case of the first embodiment, the sub video contents 831 after the binding are not actually recorded on the optical disk 700 but managed by the reproducing apparatus as link information to the data stored on the content server 710. After the binding of the contents on the content server 710, the reproducing apparatus can reproduce the photographed data 821 and the sub video data 831.

Operation Upon Photographing

Next, returning to FIG. 7, an operation upon recording of photographed video data obtained by the image pickup unit 750 onto the optical disk 700 will be described. The reproducing apparatus according to the second embodiment generates the above-described bind definition designation information and records the information onto the optical disk 700 upon recording of photographed video data.

When the operation unit 709 receives an operation instruction to start photographing from the user, the image pickup unit 750 converts an optical image of a subject through the optical system into a video signal using the image pickup device, and outputs the signal to the video signal processor 751. The video signal processor 751 converts the video signal into digital data, performs video signal processing such as gamma correction and outline emphasis on the data, and outputs the data to the output unit 708 and the content encoder 752. The output unit 708 outputs the video data to an output device such as a liquid crystal monitor. The content encoder 752 compression-encodes the video data into predetermined code format data such as MPEG 2, and outputs the compression-coded data to the multiplexer 753. The multiplexer 753 multiplexes the compression-coded data of the video signal and compression-coded data of an audio signal (not shown), and outputs the multiplexed data to the optical head unit 701. The optical head unit 701 records the data onto the optical disk 700.

Next, when the operation unit 709 receives a photographing completion operation from the user, the system controller 720 stops the photographed video data recording operation.

Further, the system controller 720 controls the GPS 755 to obtain positional data. The GPS 755 receives a radio wave from a GPS satellite and analyzes the wave, obtains data on the location of the apparatus, and outputs the data to the system controller 720. The system controller 720 outputs photographing position information from the GPS 755 to the photographing information manager 754. The photographing information manager 754 manages the photographed video data and the photographing position as data linked to each other.

The bind definition designation information generator 755 generates information designating bind definition information recorded on the content server 710. Next, the operation of the bind definition designation information generator 755 will be described in detail using FIG. 11.

Figure 11:
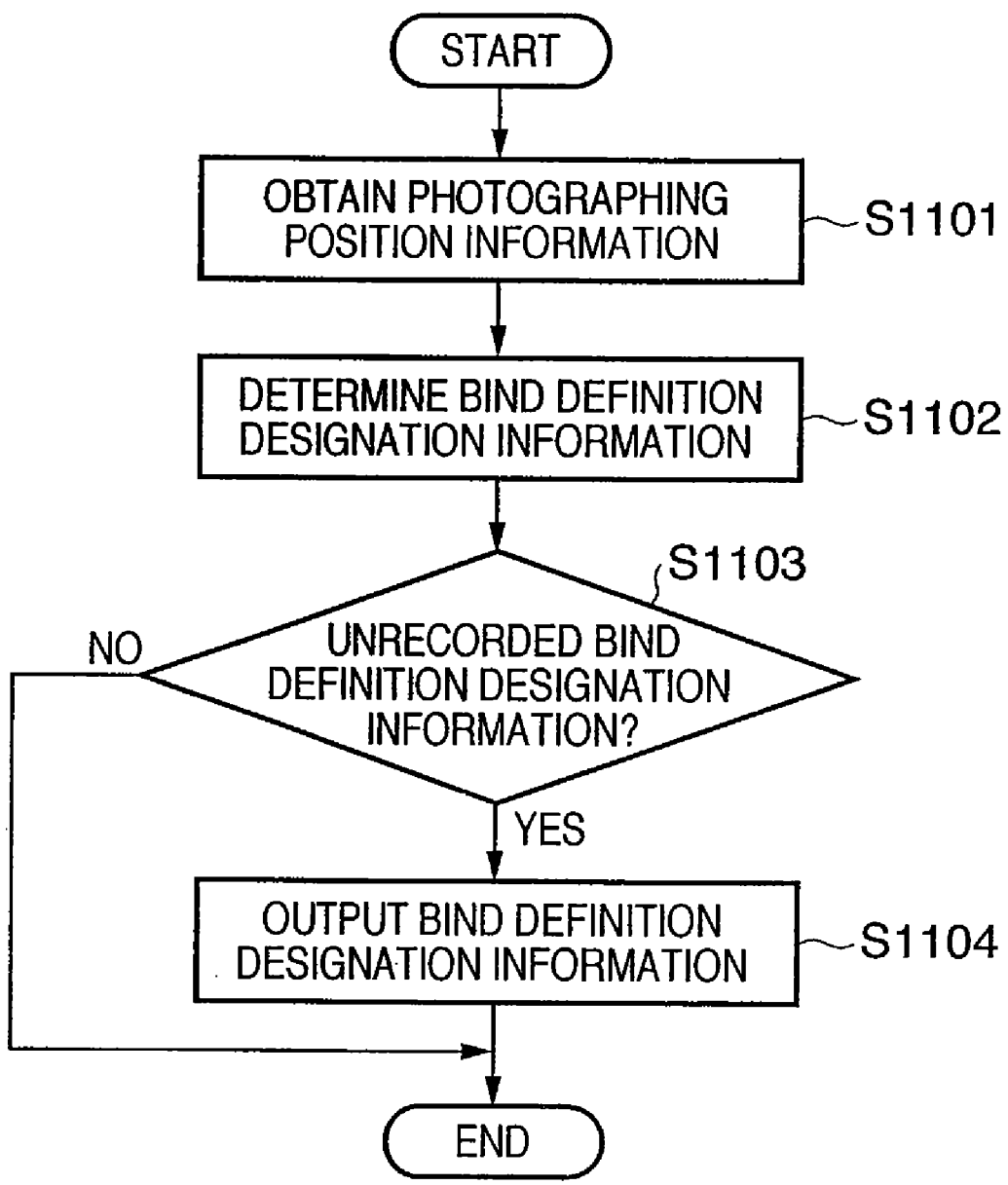
FIG. 11 is a flowchart showing the operation of the bind definition designation information generator according to the second embodiment.

FIG. 11 is a flowchart showing the operation of the bind definition designation information generator 755.

At step S1101, photographing information managed by the photographing information manager 754 is obtained. In this example, photographing position information is obtained as the photographing information. At step S1102, bind definition information to be designated is determined among the bind definition information recorded on the content server 710 (931 in FIG. 9). The reproducing apparatus has a ROM holding a program to determine bind definition information to be designated. The reproducing apparatus performs the program thereby generates information designating bind definition information recorded on the content server 710 based on the maker ID of the reproducing apparatus and the photographing information (photographing position information).

For example, when the maker ID of the reproducing apparatus according to the second embodiment is "0001" and the photographing position information of newly photographed video data is "area A", the program to generate bind definition designation information selects bind definition information included in the directory 910 corresponding to the maker ID "0001", from the contents recorded on the content server 710. In this case, the "bind definition information 1" referring to the sub video content 941 related to the "area A" is selected from the bind definition information 931.

Then, "bind definition designation information" as information designating the selected "bind definition information 1" is generated.

Then, at step S1103, it is examined whether or not the bind definition designation information generated at step S1102 is unrecorded on the optical disk 700. When the bind definition designation information is unrecorded on the optical disk 700, the process proceeds to step S1104. On the other hand, when the bind definition designation information is recorded on the optical disk 700, the process ends.

At step S1104, the bind definition designation information generated at step S1102 is outputted to the optical head unit 701 such that the information is recorded onto the optical disk 700. Further, the maker ID of the reproducing apparatus is also outputted to the optical head unit 701 such that the ID is recorded onto the optical disk 700. As a result of the above operation, new bind definition designation information is outputted from the bind definition designation information generator 755, then the system controller 720 records the generated bind definition designation information onto the optical disk 700.

As described above, the reproducing apparatus having an image pickup function and a recording and reproducing function according to the present embodiment, having the image pickup unit and a unit to record photographed video data, manages photographing information on video data photographed by the image pickup unit 750. Further, the program to generate bind definition designation information based on the photographing information is performed, thereby bind definition designation information is generated, and the generated bind definition designation information is written onto the recording medium.

In this arrangement, sub contents corresponding to the photographing information of the video data can be bound and reproduced.

In the above description, the program to generate bind definition designation information is previously stored in the internal ROM, however, the program is not necessarily stored in the internal ROM. For example, the program may be obtained from the content server 710. Further, it may be arranged such that the reproducing apparatus sends the photographing position information and the ID maker to the content server 710, and the content server 710 returns bind definition designation information based on the photographing position information.

Further, it may be arranged such that the program to determine bind definition designation information is recorded on a removable recording medium such as a memory card and the program is read from the recording medium.

Further, in the above embodiment, the bind definition designation information is determined in accordance with the maker ID of the reproducing apparatus and the photographing position. However, the bind definition designation information may be determined in accordance with any other information upon photographing, such as photographing time, a total photographing period, a photographer, a photographing subject or a photographing mode as long as the bind definition designation information is determined. For example, it may be arranged such that it is determined whether or not the user is an advanced user in correspondence with total photographing period and/or photographing mode (auto photographing or manual photographing) as an image pickup apparatus, and when it is determined that the user is an advanced user, more editing contents are provided. Further, the bind definition designation information may be determined based on only the maker ID.

Further, in the above example, the newly generated bind definition designation information is added to the bind definition designation information directory (812 in FIG. 8), however, it may be arranged such that in the bind definition designation information directory, existing bind definition designation information is replaced with the newly generated bind definition designation information.

Further, in the above embodiment, the data on the content server 710 are bound upon reproduction of the data on the content server 710, however, the timing of the binding is not limited. For example, the binding may be performed upon power-on of the reproducing apparatus, or upon mode change to a photographing mode.

Further, in the above embodiment, the sub video data are provided as sub contents from the content server, however, the sub contents are not limited to the video data. For example, application software may be provided from the content server as sub contents.

Further, in the above embodiment, the reproducing apparatus having a network interface establishes connection with the content server via the network interface. However, as the feature of the present invention is writing of bind definition designation information onto a recording medium based on photographing information, it is not necessary to provide a unit to establish connection with the content server.

Further, in the above embodiment, the contents recorded on the content server 710 are bound for the optical disk 700, however, the subject of binding is not limited to the optical disk. For example, the contents on the content server may be bound for a content recorded in an internal memory of the reproducing apparatus.

Third Embodiment

Next, as a third embodiment, the reproducing apparatus in which a video editing function is further added to the above-described second embodiment will be described.

Figure 12:
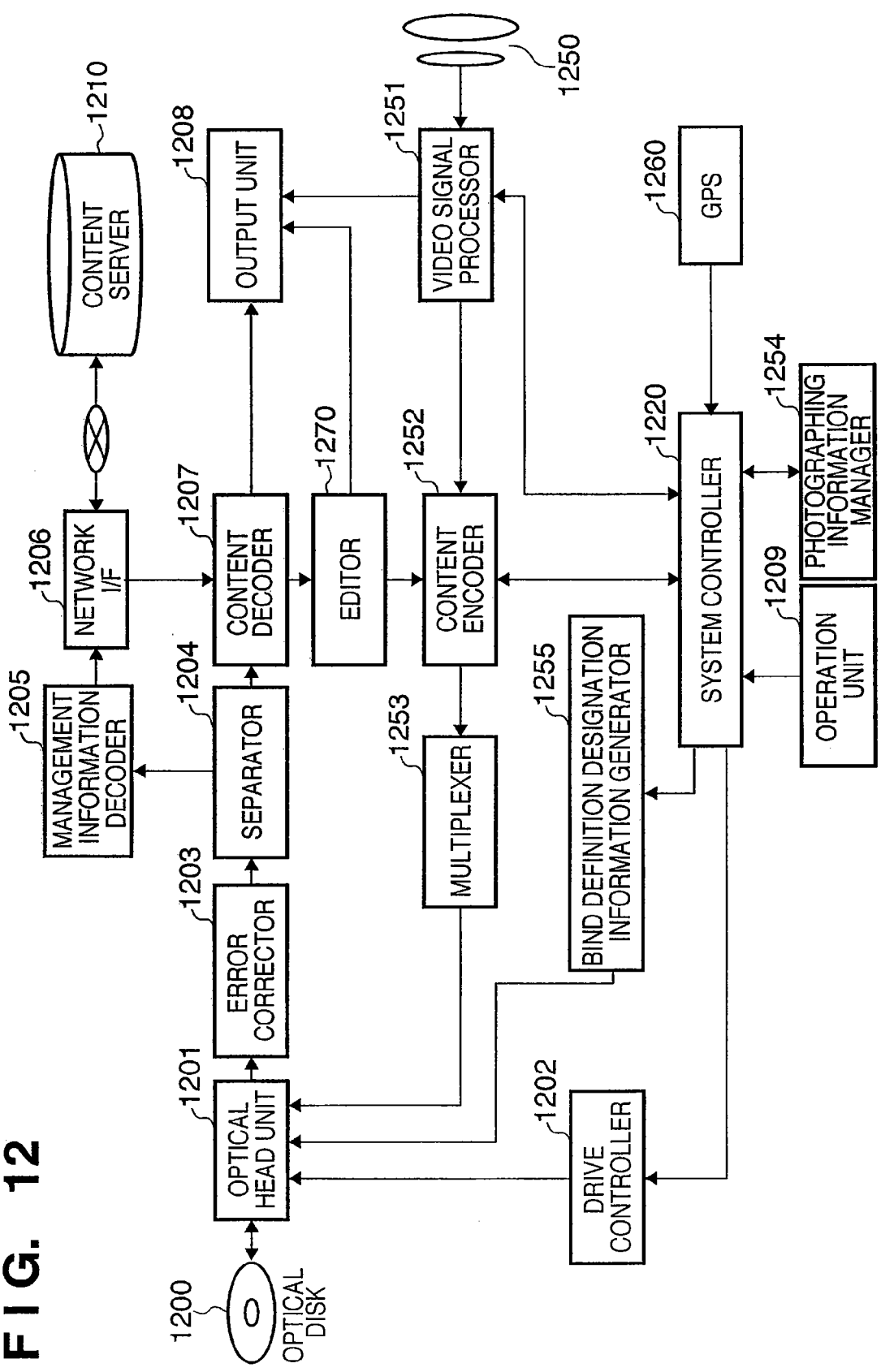
FIG. 12 is a block diagram showing the configuration of the reproducing apparatus according to a third embodiment of the present invention.

FIG. 12 is a block diagram showing the configuration of a digital video camera as the reproducing apparatus having an image pickup function, a data recording and reproducing function and an editing function according to the present embodiment.

In FIG. 12, the constituent elements from a writable optical disk 1200 to a bind definition designation information generator 1255 are the same as those described in the second embodiment denoted by numerals 700 to 755. Further, as in the case of the second embodiment, a GPS (Global Positioning System) 1260 to obtain position information is provided as a particular photographing information generation unit. In the third embodiment, the difference from the second embodiment is that an editor 1270 for editing video data is provided.

Operation Upon Reproduction

First, an operation of the reproducing apparatus having the above configuration upon reproduction of photographed video data recorded on the optical disk 1200 will be described. The optical disk 1200 holds video data photographed by an image pickup unit 1250 (the operation upon photographing will be described later). Data can be read/written to/from the optical disk 1200 using an optical head unit 1201. When an operation unit 1209 receives an optical disk reproduction request from a user, the optical head unit 1201 reads data, and an error corrector 1203 performs error correction, and a separator 1204 extracts video data. Further, a content decoder 1207 decodes the video data, and outputs the data to an output unit 1208. As the operations upon reproduction are the same as those upon optical disk reproduction in the above-described first and second embodiments, the detailed explanations of the operations will be omitted.

Operation Upon Editing

Next, an operation when video data recorded on the optical disk 1200 is edited using content(s) recorded on a content server 1210 will be described. The content server 1210 holds editing contents for editing video data. As the editing contents, image contents to be combined with photographed video images, special effect contents in which special effects such as fading and wiping to connect video images are described are held.

When the operation unit 1209 receives a mode change instruction to switch to an editing mode from the user, the apparatus switches to the editing mode, and bind the content data recorded on the content server 1210.

Hereinbelow, the operation of the content server 1210 upon binding will be described. The optical head unit 1201 reads management information data recorded in a predetermined area of the optical disk 1200. The data read from the optical disk 1200 is inputted into the separator 1204. The separator 1204 extracts the management information data from the input data, and outputs the extracted data to a management information decoder 1205. The management information decoder 1205 extracts bind definition designation information, maker ID data and content server information from the management information data.

As in the case of the second embodiment, the bind definition designation information is information to designate bind definition information recorded on the content server 1210. The generation of the bind definition designation information and recording of the information onto the optical disk 1200 will be described later. In this example, the bind definition designation information is previously recorded on the optical disk 1200. Further, the maker ID is a maker ID of the reproducing apparatus recorded data onto the optical disk. The maker ID is recorded onto the optical disk 1200 upon recording of the photographed data as described later. Note that the content server information is data indicating the location of the content server 1210.

A network interface 1206 establishes connection with the content server 1210 designated with the content server information via the network, and outputs the bind definition designation information to the content server 1210. As in the case of the first and second embodiments, the content server 1210 holding plural bind definition information returns bind definition information corresponding to the input bind definition designation information from the plural bind definition information. The system controller 1220 binds the data on the content server 1210 based on the bind definition designation information received from the content server 1210.

Figure 13:
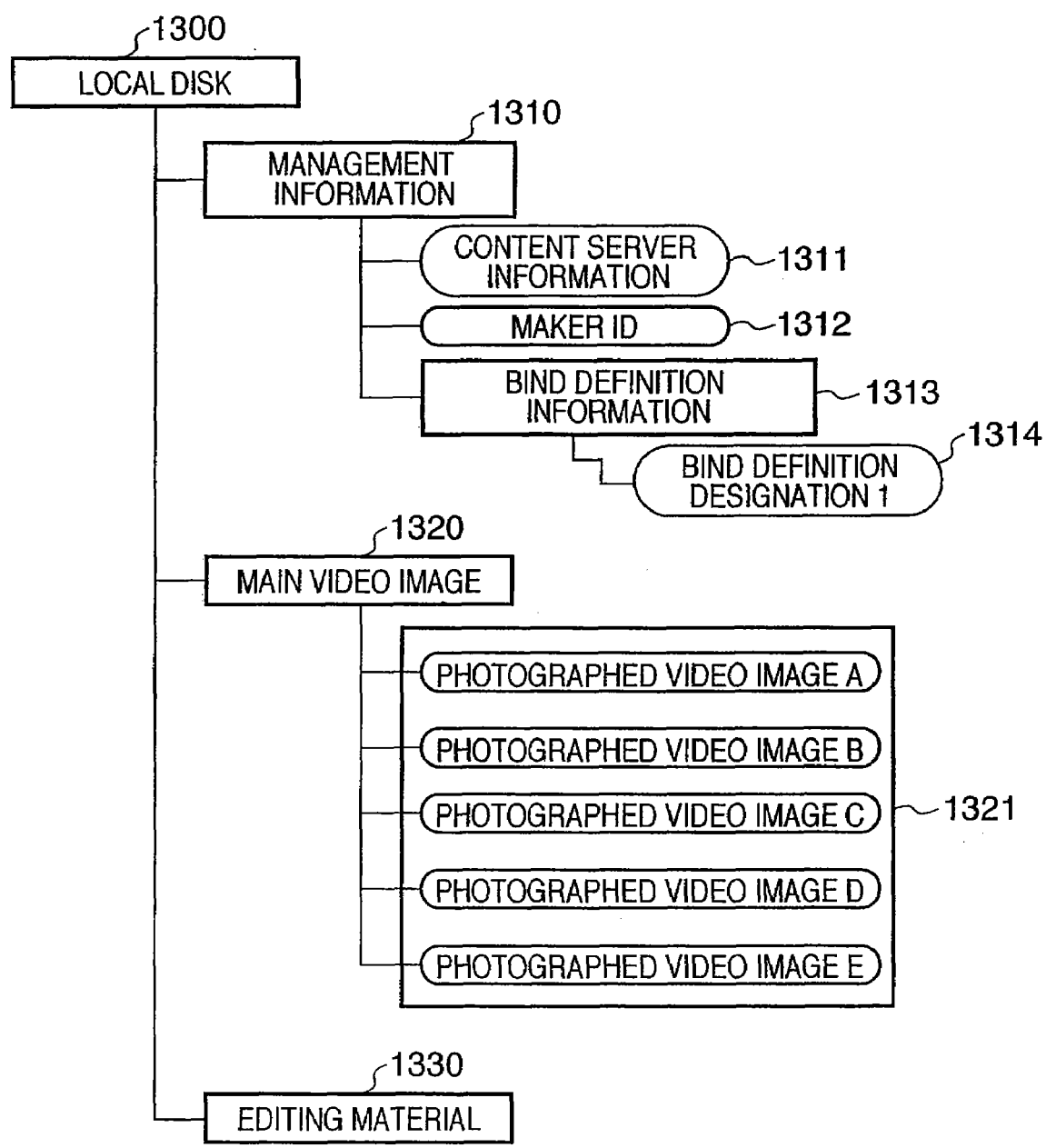
FIG. 13 is a block diagram showing the file structure of content data stored on the optical disk according to the third embodiment.

Next, the file structure upon binding will be described using FIGS. 13 to 15. FIG. 13 shows an example of the directory structure of data stored on the optical disk 1200. In FIG. 13, a directory 1300 is a root directory of the content data recorded on the optical disk 1200; a directory 1310, a directory holding disk management information; data 1311, content server information; data 1312, a maker ID; a directory 1313, a directory holding bind definition designation information; and data 1314, bind definition designation information. These information are generated under the control of the system controller 1220 upon setting of a new optical disk 1200.

Further, a directory 1320 is a directory holding video data; data 1321, video data; and a directory 1330, a directory holding editing content data.

In the single optical disk shown in FIG. 13, only the photographed video data 1321 is recorded as a content. In FIG. 13 showing a status where no data on the content server 1210 is bound, no data is recorded in the editing material content directory 1330. Accordingly, at this stage, no editing material content can be used.

Figure 14:
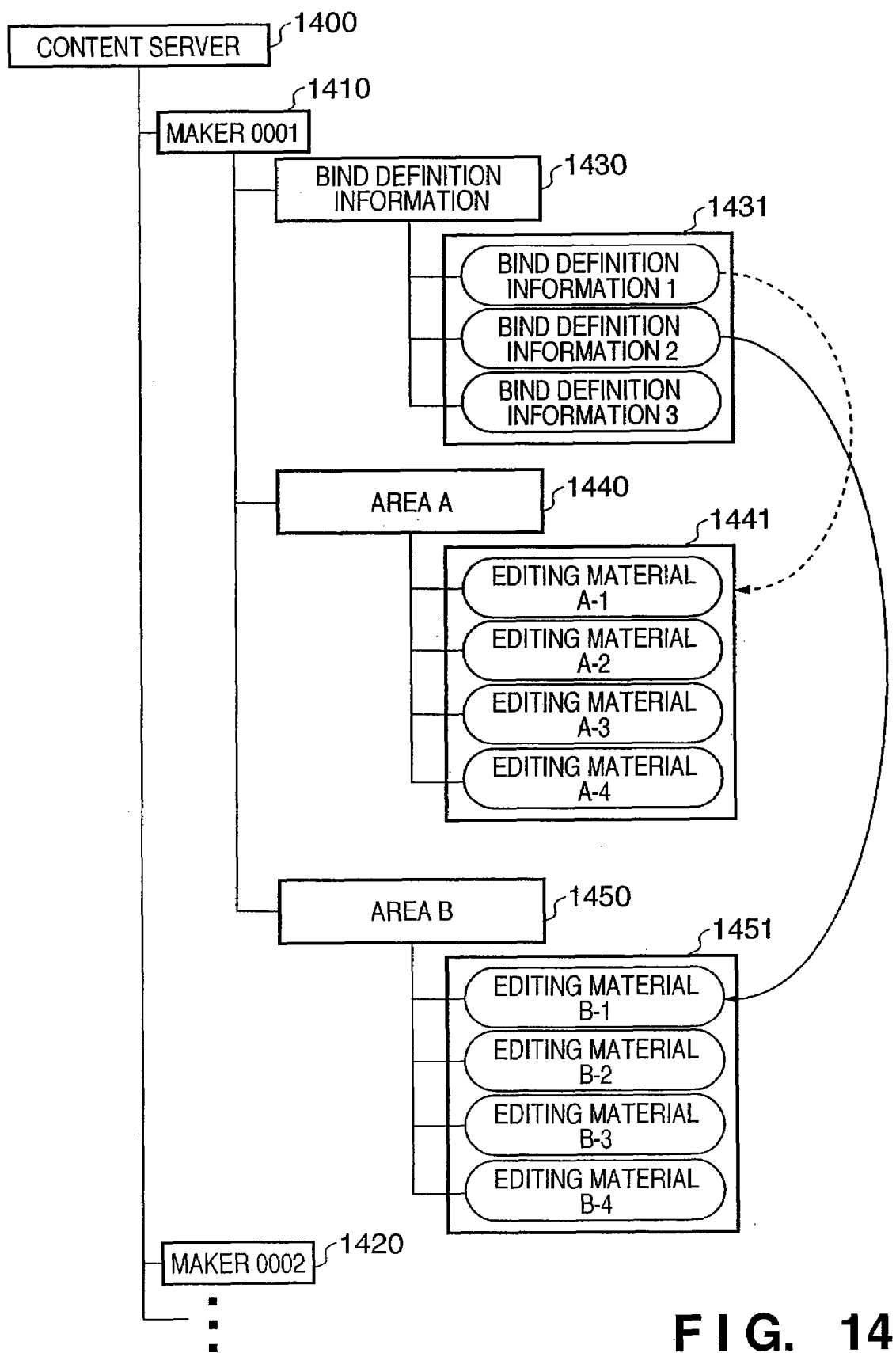
FIG. 14 is a block diagram showing the file structure of content data stored on the content server according to the third embodiment.

On the other hand, FIG. 14 shows an example of the directory structure of content data stored on the content server 1210. A directory 1400 is a root directory of the content data on the content server 1210; directories 1410 and 1420, directories holding content data corresponding to maker IDs; a directory 1430, a directory holding bind definition information; data 1431, bind definition information; directories 1440 and 1450, directories holding editing contents; and data 1441 and 1451, editing contents.

As in the case of the above embodiments, upon binding of data on the content server 1210 having the directory structure shown in FIG. 14, the reproducing apparatus sends the maker ID and the bind definition designation information 1313 recorded on the optical disk 1200 to the content server 1210. The content server 1210 returns bind definition information designated with the bind definition designation information 1313 to the reproducing apparatus. As in the case of the above-described first embodiment, the bind definition information is a file in which a bind procedure is described.

For example, when the maker ID of the reproducing apparatus according to the third embodiment is "maker 0001" and the bind definition designation information designates "bind definition information 1", the content server 1210 returns "bind definition information 1" in the bind definition information directory 1430 to the reproducing apparatus in response to a request from the reproducing apparatus. In the "bind definition information 1", information to add editing material contents 1441, "editing material A-1" to "editing material A-4" in the editing content directory 1440 of the content server 1210 to the editing material directory 1330 of the optical disk 1200 is described.

The reproducing apparatus binds the contents on the content server 1210 to the content on the optical disk 1200 in accordance with the received "bind definition information 1". FIG. 15 shows the directory structure of the optical disk 1200 in which the contents on the content server 1210 are bound.

Figure 15:
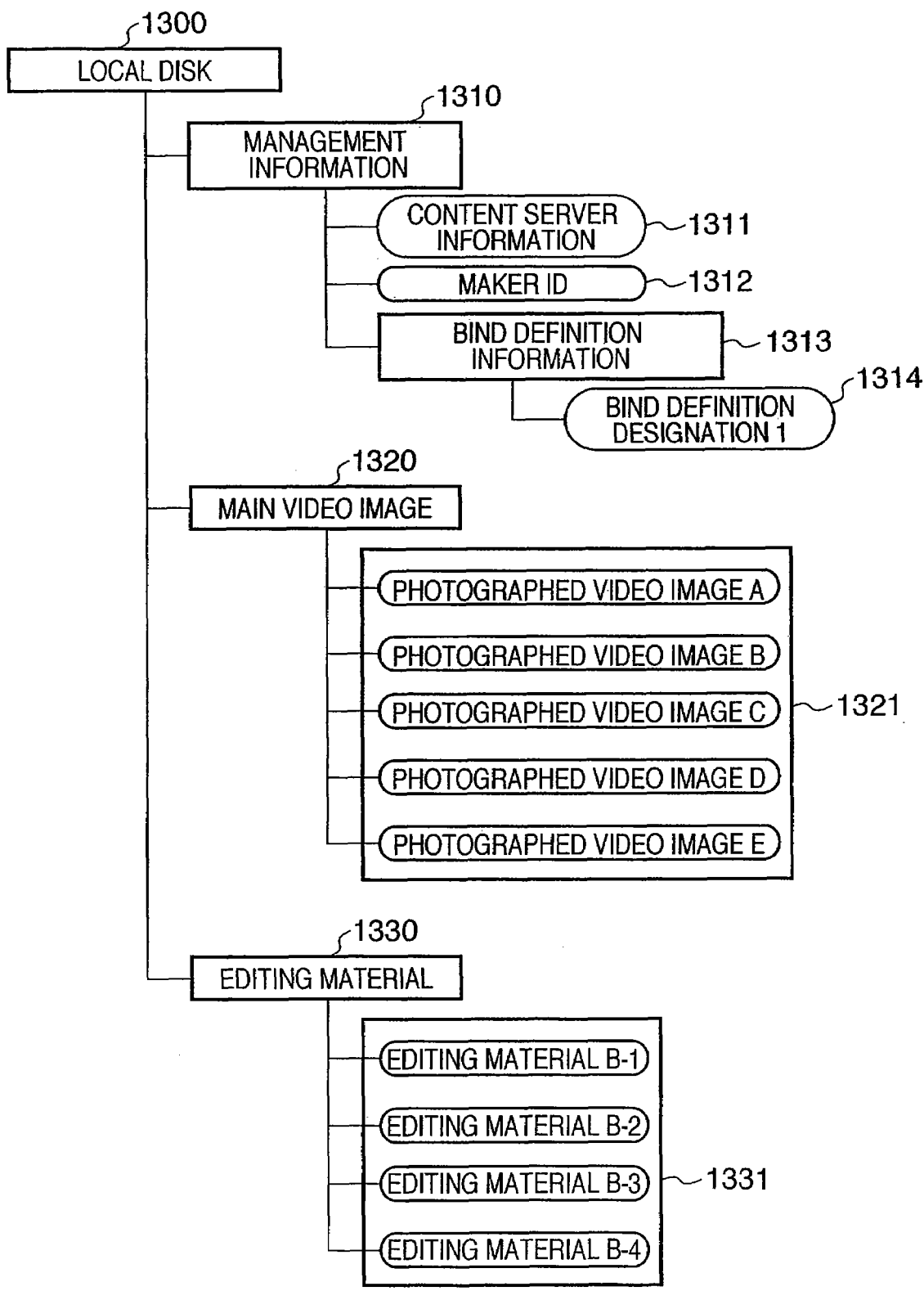
FIG. 15 is a block diagram showing the file structure of content data stored on the optical disk after the update according to the third embodiment.
Figure 18:
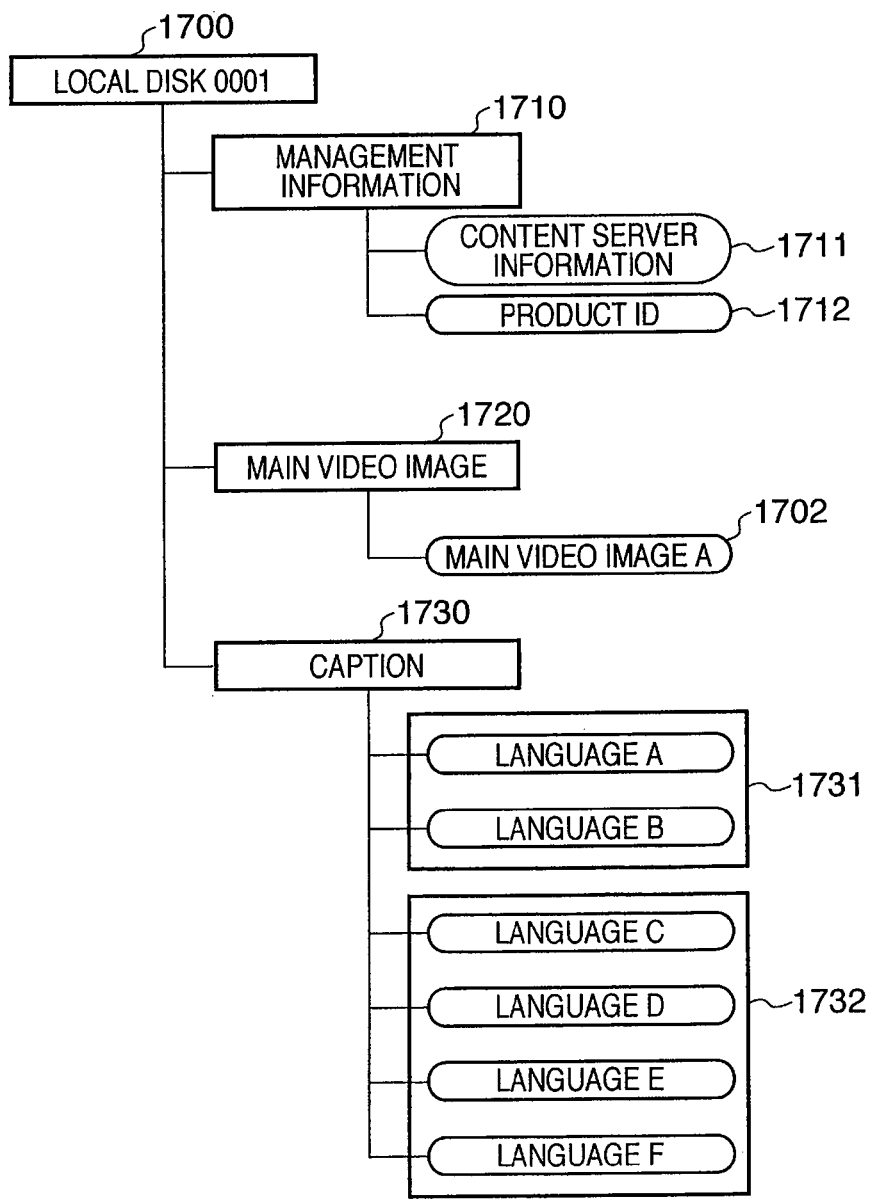
FIG. 18 is a block diagram showing the file structure of content data stored on the optical disk according to the conventional art.

In FIG. 15, the directories and data correspond to the directories and data having the same reference numerals in FIG. 13. As a result of binding the contents in accordance with the "bind definition information 1", editing material contents 1331 are newly added. The editing material contents 1331 are data corresponding to the editing material contents 1441 in FIG. 18. As in the case of the above-described first and second embodiments, the editing material contents 1331 after the binding are not actually recorded onto the optical disk 1200, but managed by the reproducing apparatus as link information to the data stored on the content server 1210. After the binding of the contents on the content server 1210, the reproducing apparatus can edit a video image utilizing the editing material contents 1331.

The operation upon binding has been described as above. Next, returning to FIG. 12, an operation upon editing photographed video data using the bound contents on the content server 1210 will be described.

In an editing mode, when a photographed image is selected by the user's operation as the subject of editing, the subject photographed image is read from the optical disk 1200. The content decoder 1207 decodes the read photographed image data, and outputs the decoded image to the editor 1270. Further, when the bound editing material content(s) on the content server 1210 are selected by the user's operation, the selected editing material content(s) are downloaded from the content server 1210 via the network interface 1206. The content decoder 1207 decodes the downloaded editing material content(s), then outputs the decoded content(s) to the editor 1270. The editor 1270 performs editing such as coupling of plural photographed images or combining photographed image and editing material content, thereby generates edited video data. The edited video data is outputted to a content encoder 1252 and the output unit 1208. The output unit 1208 outputs the edited video data to an output device such as a liquid crystal monitor. On the other hand, the content encoder 1252 encodes the edited video data to predetermined format data such as MPEG 2, and outputs the coded data to a multiplexer 1253. The multiplexer 1253 multiplexes the edited video data with audio data or the like (not shown) and outputs the multiplexed data to the optical head unit 1201. The optical head unit 1201 records the combined video data onto the optical disk 1200. In this manner, the bound data on the content server 1210 can be utilized in editing.

Operation Upon Photographing

Next, an operation upon recording of photographed video data obtained by the image pickup unit 1250 onto the optical disk 1200 will be described. The operation upon photographing is basically the same as that in the second embodiment. Upon recording of photographed video data, the reproducing apparatus according to the present embodiment generates bind definition designation information corresponding to photographing information and records the information onto the optical disk 1200.

When the operation unit 1209 receives a photographing start operation instruction from a user, the image pickup unit 1250 converts an optical image of a subject through the optical system into a video signal using the image pickup device, and outputs the signal to the video signal processor 1251. The video signal processor 1251 converts the video signal into digital data, performs video signal processing such as gamma correction and outline emphasis on the data, and outputs the data to the output unit 1208 and the content encoder 1252. The output unit 1208 outputs the video data to an output device such as a liquid crystal monitor. The content encoder 1252 compression-encodes the video data into predetermined code format data such as MPEG 2, and outputs the compression-coded data to the 1253. The multiplexer 1253 multiplexes the compression-coded data of the video signal and compression-coded data of an audio signal (not shown), and outputs the multiplexed data to the optical head unit 1201. The optical head unit 1201 records the photographed data onto the optical disk 1200.

Next, when the operation unit 1209 receives the user's photographing termination operation, the system controller 1220 stops recording operation of photographed video data. Further, the system controller 1220 obtains positional data from the GPS 1260, and outputs photographing position information to a photographing information manager 1254. The photographing information manager 1254 manages the photographed video data and the photographing position information as data linked to each other.

Next, an operation of the bind definition designation information generator 1255 will be described. The bind definition designation information generator 1255 generates information designating bind definition information recorded on the content server 1210. The bind definition designation information generator 1255 generates bind definition designation information corresponding to photographing position information managed by the photographing information manager 1256.

For example, when the maker ID of the reproducing apparatus according to the present embodiment is "0001" and the photographing position information of newly photographed video data is "area A", in the program to generate bind definition designation information, bind definition information included in the directory 1410 corresponding to the maker ID "0001" is selected from the contents recorded on the content server 1210. In this case, "bind definition information 1" referring to the editing content 1441 related to the "area A" is selected from the bind definition information 1431.

Then, "bind definition designation information" as information designating the selected "bind definition information 1" is generated.

When the new bind definition designation information is outputted from the bind definition designation information generator 1255, the system controller 1220 records the generated bind definition designation information onto the optical disk 1200.

As described above, the reproducing apparatus according to the third embodiment manages the photographing information of video data, and performs the program to generate bind definition designation information based on the photographing information, thereby generates bind definition designation information. Then, the apparatus writes the generated bind definition designation information onto a recording medium.

In this arrangement, upon editing of photographed data, editing content(s) corresponding to a photographing position can be bound and utilized.

Further, in the above embodiment, the data on the content server 1210 is bound upon switching to the editing mode, however, the binding may be performed at any timing. For example, the binding may be performed at timing of power-on of the reproducing apparatus or a timing of switching to the photographing mode.

Further, in the above embodiment, the editing contents are provided from the content server as sub contents, however, the sub contents provided from the content server are not limited to the editing contents. For example, application software and the like may be provided.

Further, in the above embodiment, as the network interface, a cable network interface or a radio network interface may be employed.

In the above-described embodiments of the present invention, the respective processings according to the embodiments are performed by the system controller, which generally has a CPU and a memory holding a program to realize its processings. Accordingly, the present invention includes such computer program in its scope. Further, generally, a computer program is stored on a computer-readable storage medium such as a CD-ROM and is executable when it is installed or copied in a computer system. Accordingly, it is apparent that the present invention includes such computer-readable storage medium in its scope.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-175787, filed Jun. 26, 2006, which is hereby incorporated by reference herein in its entirety.

What is claimed is:

1. A video reproducing apparatus comprising:
   a reproducing unit to reproduce information recorded on a recording medium;
   a communication unit to establish connection with a network; and
   an acquisition unit to perform communication with a network server holding sub information to be reproduced by said reproducing unit related to video information recorded on said recording medium via said communication unit,
   wherein said acquisition unit is configured to acquire definition information describing information related to a location of said sub information from said network server, based on predetermined information about said network server recorded on said recording medium,
   said video reproducing apparatus further comprising:
   a selection unit to select the definition information to be acquired by said acquisition unit in correspondence with a reproduction history of said video reproducing apparatus.

2. The video reproducing apparatus according to claim 1, wherein said definition information is link information to acquire said sub information.

3. The video reproducing apparatus according to claim 1, wherein said selection unit selects said definition information based on said reproduction history of the video information or said sub information.

4. The video reproducing apparatus according to claim 3, wherein said selection unit selects specific definition information at an initial stage of reproduction of video information recorded on said recording medium.

5. The video reproducing apparatus according to claim 4, wherein said selection unit selects definition information different from said specific definition information after completion of reproduction of video information recorded on said recording medium.

6. The video reproducing apparatus according to claim 1, wherein said selection unit selects definition information which differs in correspondence with the number of times of reproduction of video information recorded on said recording medium.

7. The video reproducing apparatus according to claim 1, further comprising an image pickup unit and a recording unit to record video information photographed by said image pickup unit onto said recording medium,
wherein, in the case said reproducing unit reproduces the video information recorded by said recording unit, said selection unit selects definition information based on one or combined photographing information generated by said image pickup unit, position information of said image pickup unit and unique information of said image pickup unit.

8. The video reproducing apparatus according to claim 1, further comprising an image pickup unit, a recording unit to record video information photographed by said image pickup unit onto said recording medium and an editing unit to edit recorded video information,
wherein, in the case said editing unit edits the video information recorded on said recording medium, said selection unit selects definition information indicating material information related to editing of video information photographed by said image pickup unit.

9. The video reproducing apparatus according to claim 1, wherein the predetermined information, on which the acquisition of the definition information is based, is reproduced by said reproducing unit.

10. The video reproducing apparatus according to claim 1, wherein the reproducing unit is a reproducing unit to reproduce said video information and sub information in accordance with said definition information acquired by said acquisition unit upon reproduction of video information recorded on said recording medium.

11. The video reproducing apparatus according to claim 1, wherein the selection unit is a selection unit to select new definition information in correspondence with a reproduction completion of the video information by said reproducing unit, and
the acquisition unit is a acquisition unit to acquire the new definition information from said network server.

12. A control method for a video reproducing apparatus having a communication unit to establish connection with a network, comprising:
a reproducing step of reproducing information recorded on a recording medium; and
an acquisition step of performing communication with a network server holding sub information to be reproduced at said reproducing step related to video information recorded on said recording medium via said communication unit,
wherein said acquisition step includes a step of acquiring definition information describing information related to a location of said sub information from said network server, based on predetermined information about said network server recorded on said recording medium,
said method further comprising:
a selection step of selecting the definition information to be acquired at said acquisition step in correspondence with a reproduction history of said video reproducing apparatus.

13. The control method for a video reproducing apparatus according to claim 12,
wherein the predetermined information, on which the acquisition of the definition information is based, is reproduced at said reproducing step.

14. The control method for a video reproducing apparatus according to claim 12,
wherein the reproducing step is a reproducing step of reproducing said video information and sub information in accordance with said definition information acquired at said acquisition step upon reproduction of video information recorded on said recording medium.

15. The control method for a video reproducing apparatus according to claim 12,
wherein the selection step is a selection step of selecting new definition information in correspondence with a reproduction completion of the video information at said reproducing step, and
the acquisition step is a acquisition step of acquiring the new definition information from said network server.

16. A computer program stored on a computer-readable storage medium, read and executed by a computer having a communication unit to establish connection with a network, thereby causes said computer to function as a video reproducing apparatus, said computer program functioning as:
a reproducing unit to reproduce information recorded on a recording medium; and
an acquisition unit to perform communication with a network server holding sub information to be reproduced by said reproducing unit related to video information recorded on said recording medium via said communication unit,
wherein said acquisition unit is configured to acquire definition information describing information related to a location of said sub information from said network server, based on predetermined information about said network server recorded on said recording medium,
said computer program further functioning as:
a selection unit to select the definition information to be acquired by said acquisition unit in correspondence with a reproduction history of said video reproducing apparatus.

17. The computer program according to claim 16,
wherein the predetermined information, on which the acquisition of the definition information is based, is reproduced by said reproducing unit.

18. The computer program according to claim 16,
wherein the computer program functions as a reproducing unit to reproduce said video information and sub information in accordance with said definition information acquired by said acquisition unit upon reproduction of video information recorded on said recording medium.

19. The computer program according to claim 16,
wherein the computer program functions as a selection unit to select new definition information in correspondence with a reproduction completion of the video information by said reproducing unit, and
the acquisition unit is a acquisition unit to acquire the new definition information from said network server.

* * * * *